(12) United States Patent
Nilsson et al.

(10) Patent No.: US 6,317,959 B1
(45) Date of Patent: Nov. 20, 2001

(54) PROCESS AND APPARATUS FOR PACKING INSULATION MATERIAL IN A PASSAGE BETWEEN FIRST AND SECOND ELEMENTS

(75) Inventors: Bengt Gunnar Nilsson; Lennart Olof Svensson, both of Falkenberg (SE)

(73) Assignee: Owens Corning Sweden A.B., Falkenberg (SE)

(*) Notice: Subject to any disclaimer, the term of this patent is extended or adjusted under 35 U.S.C. 154(b) by 0 days.

(21) Appl. No.: 09/251,250

(22) Filed: Feb. 16, 1999

(51) Int. Cl.$^7$ ....................................................... B23P 19/04
(52) U.S. Cl. ........................ 29/455.1; 29/468; 29/890.08
(58) Field of Search ............................. 29/890.08, 455.1, 29/468, DIG. 44, DIG. 84

(56) References Cited

U.S. PATENT DOCUMENTS

| | | | |
|---|---|---|---|
| Re. 32,258 | * | 10/1986 | Kondo et al. ........................ 29/157 R |
| 4,024,698 | * | 5/1977 | Weiss et al. ............................ 57/34.5 |
| 4,030,651 | * | 6/1977 | Weiss et al. ............................. 226/97 |
| 4,215,805 | * | 8/1980 | Nielsen .................................... 226/97 |
| 4,298,153 | * | 11/1981 | Stables et al. ........................... 226/97 |
| 4,569,471 | * | 2/1986 | Ingemansson et al. ............... 228/176 |
| 4,631,912 | * | 12/1986 | Hardy ...................................... 57/279 |
| 4,774,985 | * | 10/1988 | Broadbelt et al. ...................... 141/12 |
| 5,092,122 | * | 3/1992 | Bainbridge .............................. 60/272 |
| 5,379,806 | * | 1/1995 | Matthews et al. ................... 138/149 |
| 5,398,407 | * | 3/1995 | Stuer ....................................... 29/890 |
| 5,461,777 | * | 10/1995 | Ikeda et al. ........................ 29/890.08 |
| 5,479,706 | * | 1/1996 | Tamano et al. .................... 29/890.08 |
| 5,487,412 | * | 1/1996 | Matthews et al. ................... 138/149 |
| 5,976,453 | * | 11/1999 | Nilsson et al. ........................ 264/555 |
| 6,094,817 | * | 8/2000 | Shah et al. ......................... 29/890.08 |
| 6,148,519 | * | 11/2000 | Stenersen et al. ................. 29/890.08 |
| 6,158,547 | * | 12/2000 | Ackermann et al. ................. 181/256 |

FOREIGN PATENT DOCUMENTS

| | | |
|---|---|---|
| 2 544 777 | 10/1984 | (FR) . |
| 1419810 | 12/1975 | (GB) . |
| WO96/01389 | 1/1996 | (WO) . |

* cited by examiner

*Primary Examiner*—S. Thomas Hughes
*Assistant Examiner*—Essama Omgba
(74) *Attorney, Agent, or Firm*—Inger H. Eckert

(57) ABSTRACT

An apparatus and process are provided for filling a passage between first and second elements with fiber insulation material. The apparatus comprises a support, an exhaust box rotatably mounted on the support and having an inner cavity and a fixture, a device effecting rotation of the exhaust box, and first and second elements. The first element has an outer surface and the second element has an inner surface. The second element is positioned relative to the first element such that the first and second elements define therebetween the passage which is filled with fiber insulation material. At least one of the first and second elements is perforated. The apparatus further includes at least one filling nozzle adapted to supply fiber insulation material to the passage and a vacuum source adapted to draw a partial vacuum in the exhaust box inner cavity while the fiber insulation material is supplied to the passage. The partial vacuum causes air to be pulled through the at least one perforated element thus causing the fiber insulation material to be densely packed within the passage.

16 Claims, 23 Drawing Sheets

PROCESS AND APPARATUS FOR PACKING INSULATION MATERIAL IN A PASSAGE BETWEEN FIRST AND SECOND ELEMENTS

TECHNICAL FIELD AND INDUSTRIAL APPLICABILITY OF THE INVENTION

This invention relates to a process and apparatus for packing insulation material in a passage or gap between first and second elements.

BACKGROUND OF THE INVENTION

Chimney duct sections comprising inner and outer pipes having insulation material located in an annular passage or gap between the two pipes are known. The insulation material is rock or basalt wool having a density of about 100–200 grams/liter. The wool is packed into the annular passage via a press or manually assembled. The packing process is very slow. Hence, costs associated with the manufacture of such chimney duct sections are high. Further, since the wool is formed from very short fibers having very small diameters, environmental concerns may be associated with the duct sections.

Accordingly, there is a need for an improved chimney duct section design wherein production costs are reduced and the materials incorporated into the product are more environmentally acceptable.

SUMMARY OF THE INVENTION

The present invention is directed to an insulated pipe assembly and an apparatus and process for forming same. The pipe assembly comprises an inner pipe, an outer pipe located about the inner pipe so as to be substantially coaxial with the inner pipe, and insulation material located in an annular passage or gap between the two pipes. The insulation material preferably comprises continuous glass fiber material having a density less than about 200 grams/liter. The insulated pipe assembly may be used in any application where heated or cooled gas or other fluid is transported through an insulated pipe system. Depending upon the length required for a particular application, two or more pipe assemblies may be assembled end to end to form a pipe system or structure. Hence, each pipe assembly may define a single section which can be joined by conventional means to one or two additional sections.

In accordance with a first aspect of the present invention, an insulation packing process is provided. It involves providing a first element having an outer surface and a second element having an inner surface. At least one of the first and second elements is perforated. The first and second elements are provided on a fixture. The second element is located so as to be positioned relative to the first element such that the first element outer surface and the second element inner surface define a passage between the first and the second elements for receiving fiber insulation material. The fixture forms part of an exhaust box. The exhaust box has an inner cavity which communicates with a vacuum source. The process further comprises the steps of: supplying fiber insulation material to the passage; rotating the fixture and the first and second elements during the supplying step; and drawing a partial vacuum in the exhaust box via the vacuum source while fiber insulation material is being supplied to the passage. The partial vacuum causes air to be pulled through the at least one perforated element so as to cause the fiber insulation material to be densely packed within the passage.

In one embodiment, the first element comprises a substantially solid, cylindrical element and the second element comprises a substantially perforated, cylindrical element. In a second embodiment, the first element comprises a substantially perforated, cylindrical element and the second element comprises a substantially solid, cylindrical element. In a third embodiment, the first element comprises a substantially perforated, cylindrical element and the second element comprises a substantially perforated, cylindrical element.

The fixture and the first and second elements may be rotated at a speed of from about 5 RPM to about 120 RPM.

The process further comprises the steps of adding an element having a generally solid wall after the passage has been filled with a desired amount of the fiber insulation material and thereafter removing the at least one perforated element.

The step of providing fiber insulation material to the passage comprises the step of supplying expanded, continuous fiber strand material to the passage. The expanded fiber strand material packed in the passage preferably has a density of from about 50 grams/liter to about 200 grams/liter.

In accordance with a second aspect of the present invention, a packing apparatus is provided comprising: a support; an exhaust box rotatably mounted on the support and having an inner cavity and a fixture; a device effecting rotation of the exhaust box; a first element having an outer surface and a second element having an inner surface. The second element is positioned relative to the first element such that the first and second elements define therebetween a passage which is adapted to receive fiber insulation material. At least one of the first and second elements is perforated. The apparatus further comprises at least one filling nozzle supplying fiber insulation material to the passage, and a vacuum source adapted to draw a partial vacuum in the exhaust box inner cavity while the fiber insulation material is supplied to the passage. The partial vacuum causes air to be pulled through the at least one perforated element thus causing the fiber insulation material to be densely packed within the passage.

In accordance with a third aspect of the present invention, an insulated pipe assembly is provided comprising an inner pipe having an outer surface and an outer pipe having an inner surface. The outer pipe is positioned relative to the inner pipe such that the inner pipe outer surface and the outer pipe inner surface define a passage between the inner and outer pipes. The assembly further comprises continuous fiber insulation material located in the passage.

Preferably, the continuous fiber insulation material has a density of from about 50 grams/liter to about 200 grams/liter. It is also preferred that the insulation material comprise expanded fiber insulation material in the form of a glass wool-type product.

DETAILED DESCRIPTION AND PREFERRED EMBODIMENTS OF THE INVENTION

Figure 2:
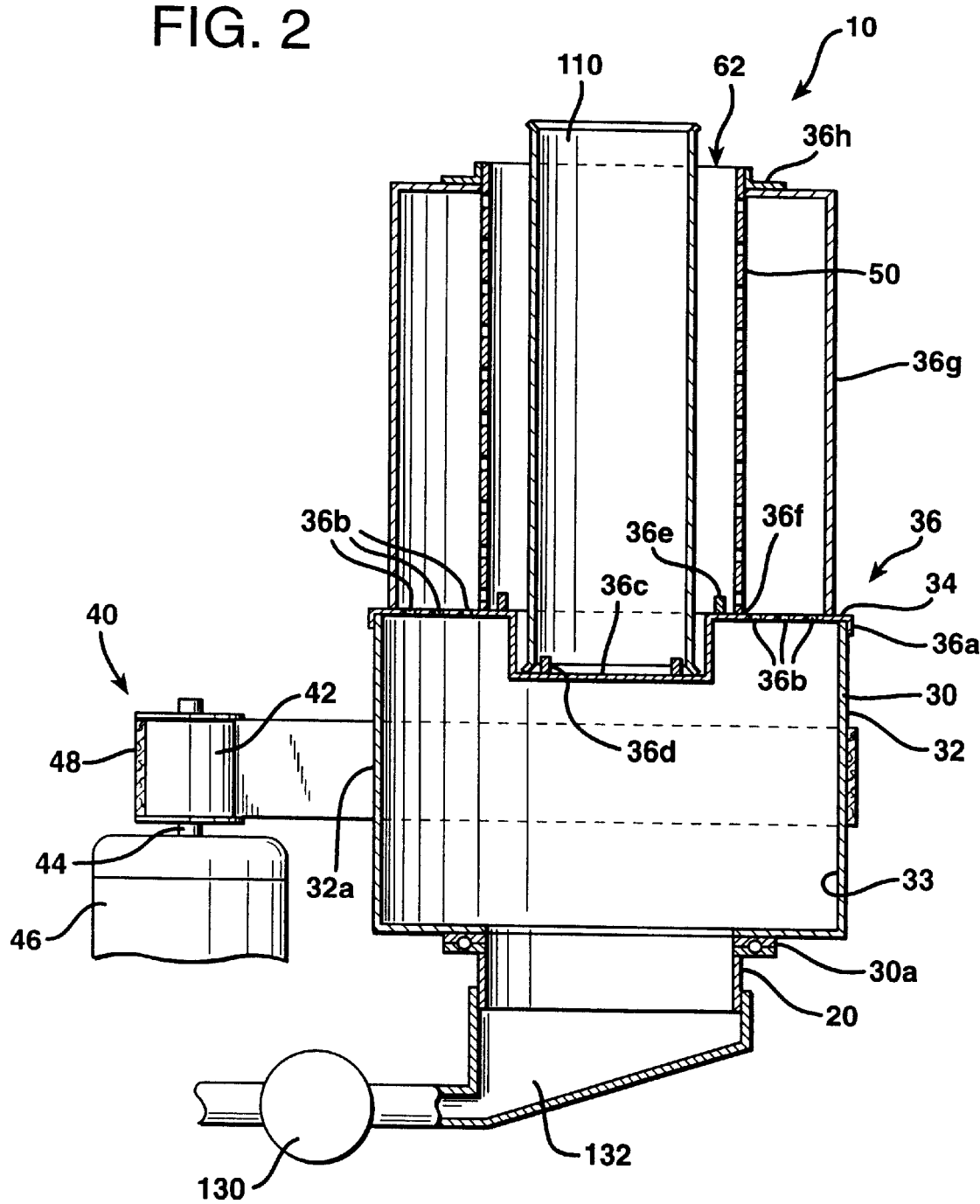
FIG. 2 is a side view, partially in cross section, of an apparatus constructed in accordance with a first embodiment of the present invention for forming the pipe assembly illustrated in FIG. 1.

A packing apparatus 10 constructed in accordance with a first embodiment of the present invention is illustrated in FIG. 2. It comprises a fixed support 20 and an exhaust box 30 rotatably mounted to the support 20, such as by a bearing 30a. The exhaust box 30 comprises a generally hollow housing 32 having an inner cavity 33 and an upper section 34 which defines a fixture 36. Further provided is a rotating device 40 for effecting rotation of the exhaust box 30. The device 40 comprises a drive pulley 42 which is coupled to a rotatable shaft 44 of a drive motor 46. A drive belt 48 extends about the outer surface 32a of the exhaust box housing 32 and the drive pulley 42 and effects rotation of the exhaust box 30 upon actuation of the motor 46.

The fixture 36 comprises a base plate 36a having an upper portion 36f with a plurality of openings 36b through which air is allowed to pass. The plate 36a further includes a recess 36c, a first annular positioning element 36d located within the recess 36c, and a second annular positioning element 36e located on the upper portion 36f. The fixture 36 also includes a housing 36g welded or otherwise fastened to the plate 36a, and a seal ring 36h.

In the embodiment illustrated in FIGS. 2–7, the apparatus 10 further includes an outer, perforated packing element 50. As illustrated in FIG. 2, the outer element 50 is positioned within the housing 36g and sits on the upper portion 36f of the plate 36a. The outer element 50 fits about the annular positioning element 36e which properly locates the element 50 relative to the fixture 36. The outer element 50 is removable from the plate 36a. The seal ring 36h is positioned about the outer element 50, see FIG. 2, so as to effect a seal between the outer element 50 and the housing 36g.

In forming an insulated pipe assembly 100 using the apparatus 10 illustrated in FIGS. 2–7, an inner pipe 110 is positioned within the outer packing element 50 such that it sits in the recess 36c of the plate 36a and fits about the annular positioning element 36d. Two filling nozzles 60 are located just above a gap 62 between the inner pipe 110 and the outer packing element 50. The nozzles 60 can be fixed in position by any conventional support structure (not shown) or held manually in position. Preferably, the nozzles 60 are constructed in the manner set out in copending, commonly assigned patent application, U.S. Ser. No. 09/106,670, entitled "Device and Process for Expanding Strand Material," filed on Jun. 29, 1998, by Nilsson et al., the disclosure of which is hereby incorporated by reference herein. One or three or more nozzles 60 may also be provided.

Figure 3:
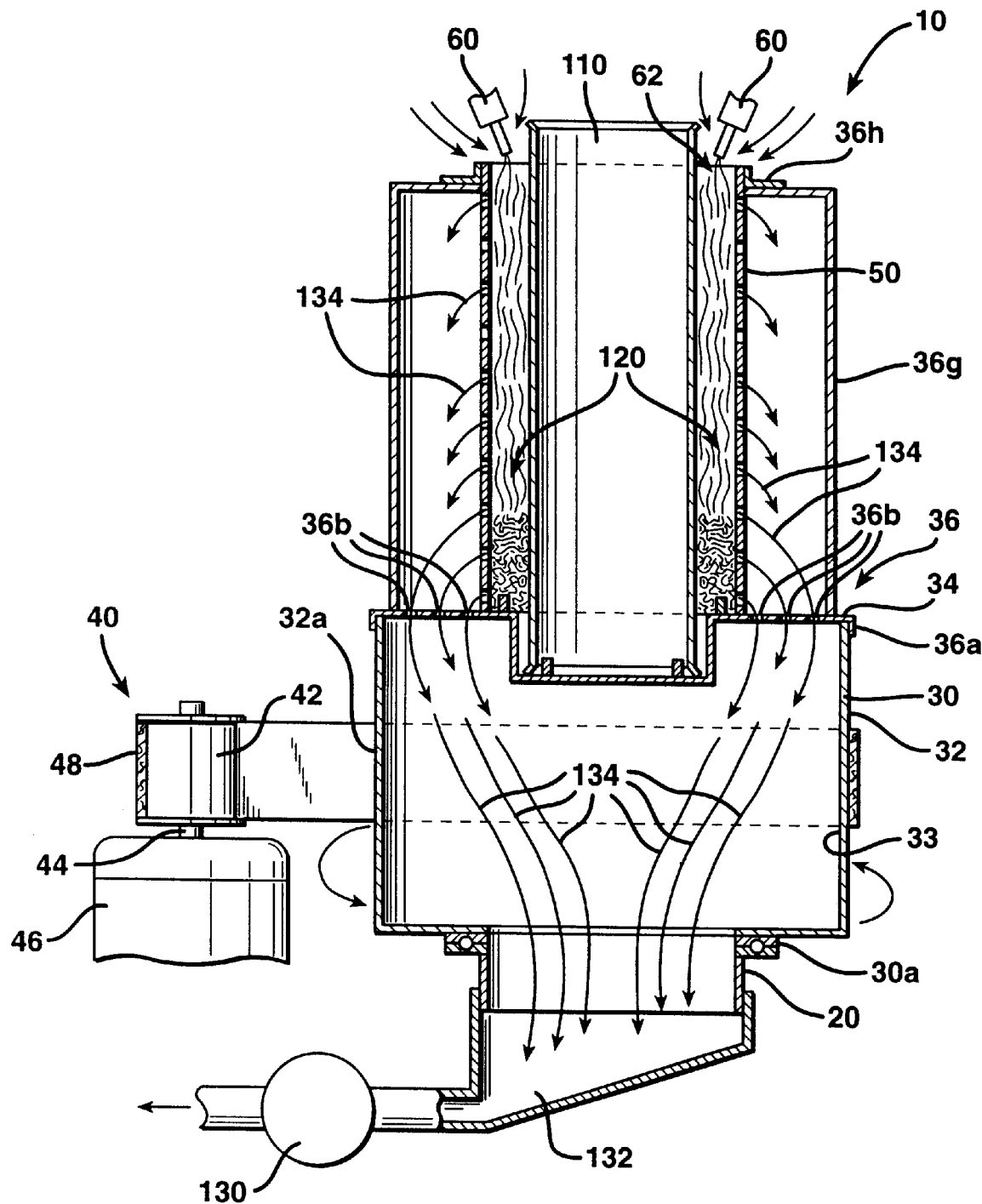
FIGS. 3–7 are sequential views of a process involving use of the apparatus illustrated in FIG. 2 for forming the pipe assembly illustrated in FIG. 1.
Figure 4:
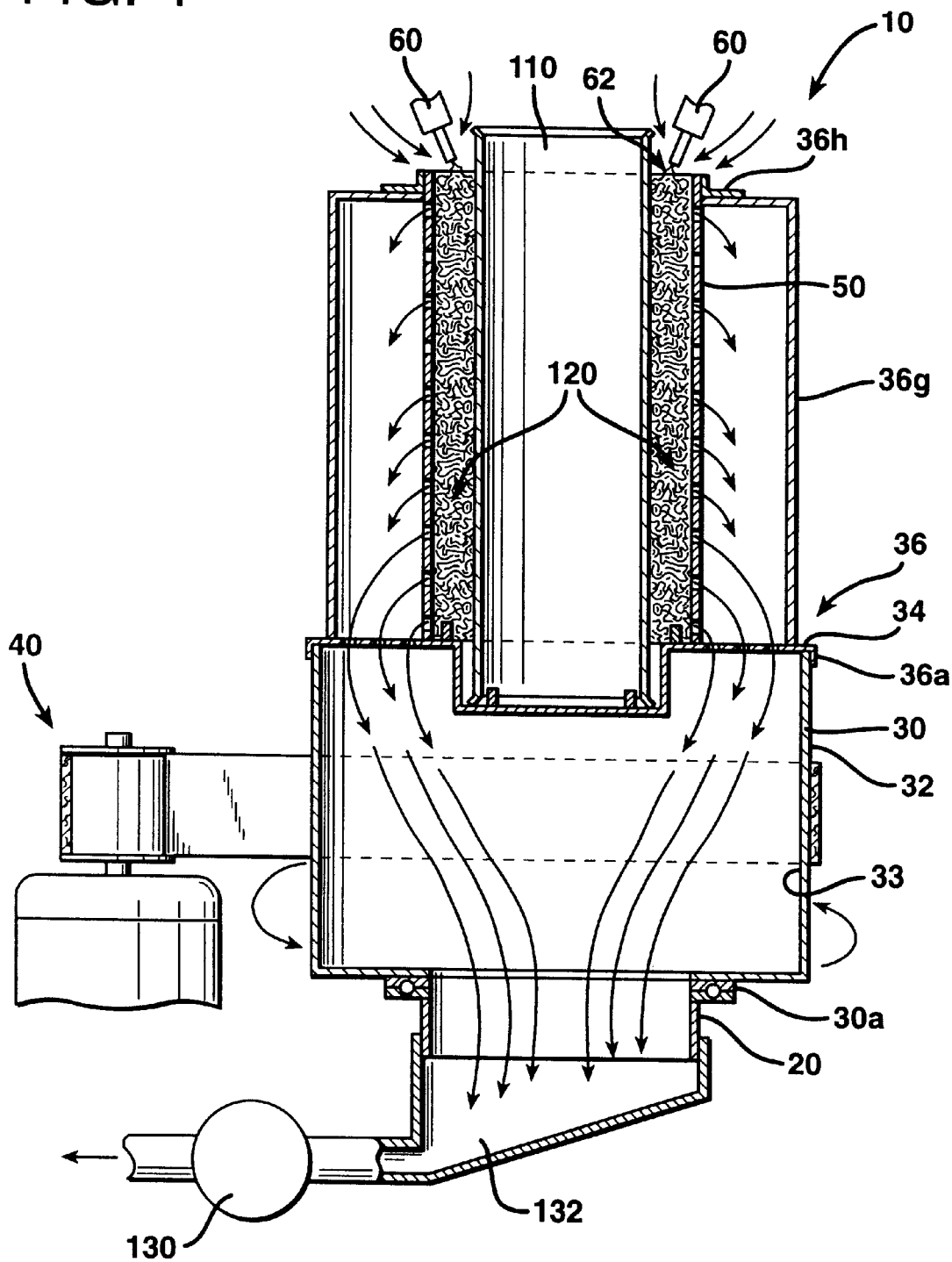

The nozzles 60 supply fiber insulation material 120 to the gap 62, see FIGS. 3 and 4. Preferably, the insulation material 120 comprises continuous strand material such as a conventional reinforcement glass fiber strand. The term "glass fiber strand" as used herein means a strand formed from a plurality of glass fibers. An example of such a strand is a commercially available roving having, for examples 4000 fibers. Preferably, the strands are formed from E-glass or S-glass type fibers. It is further contemplated that the continuous strand material may comprise continuous basalt fiber strands or fiber strands formed of other materials. Discontinuous fibers may also be used.

The nozzles 60 comprise an expanding or texturing device for expanding the fiber insulation material 120 into a wool-type product. That is, it separates and entangles the fibers of the material 120 so that the material 120 emerges from distal ends of the nozzles 60 as a continuous length of a "fluffed-up" material or wool-type product.

During the filling process, the exhaust box 30 and, hence, the inner pipe 110 and the packing element 50 are caused to rotate by the rotating device 40. Preferably, the inner pipe 110 and the packing element 50 rotate at a speed of from about 5 RPM to about 120 RPM and more preferably about 60 RPM. Also during the filling process, a vacuum source 130, which communicates with the hollow housing inner cavity 33 via a conduit 132, is operated. The vacuum source 130 creates a partial vacuum in the inner cavity 33 so that the pressure in the inner cavity 33 is below atmospheric pressure and preferably from about 500 Pa to about 40,000 Pa below atmospheric pressure, i.e., the absolute pressure in the inner cavity 33 is from about 61,300 Pa to about 100,800 Pa. As is illustrated by arrows 134 in FIG. 3, the partial vacuum created within the inner cavity 33 results in air being pulled through the perforated packing element 50 and the openings 36b in the base plate 36a thus causing the fiber insulation material 120 to be densely packed within the gap 62. It is preferred that the insulation material 120 be packed within the gap 62 at a density of between about 50 grams/liter to about 200 grams/liter and all ranges subsumed therein. Rotation of the inner pipe 110 and the packing element 50 is beneficial as it ensures that an equal density 44 of the fiber insulation material 120 results between the inner pipe 110 and the packing element 50.

Figure 1:
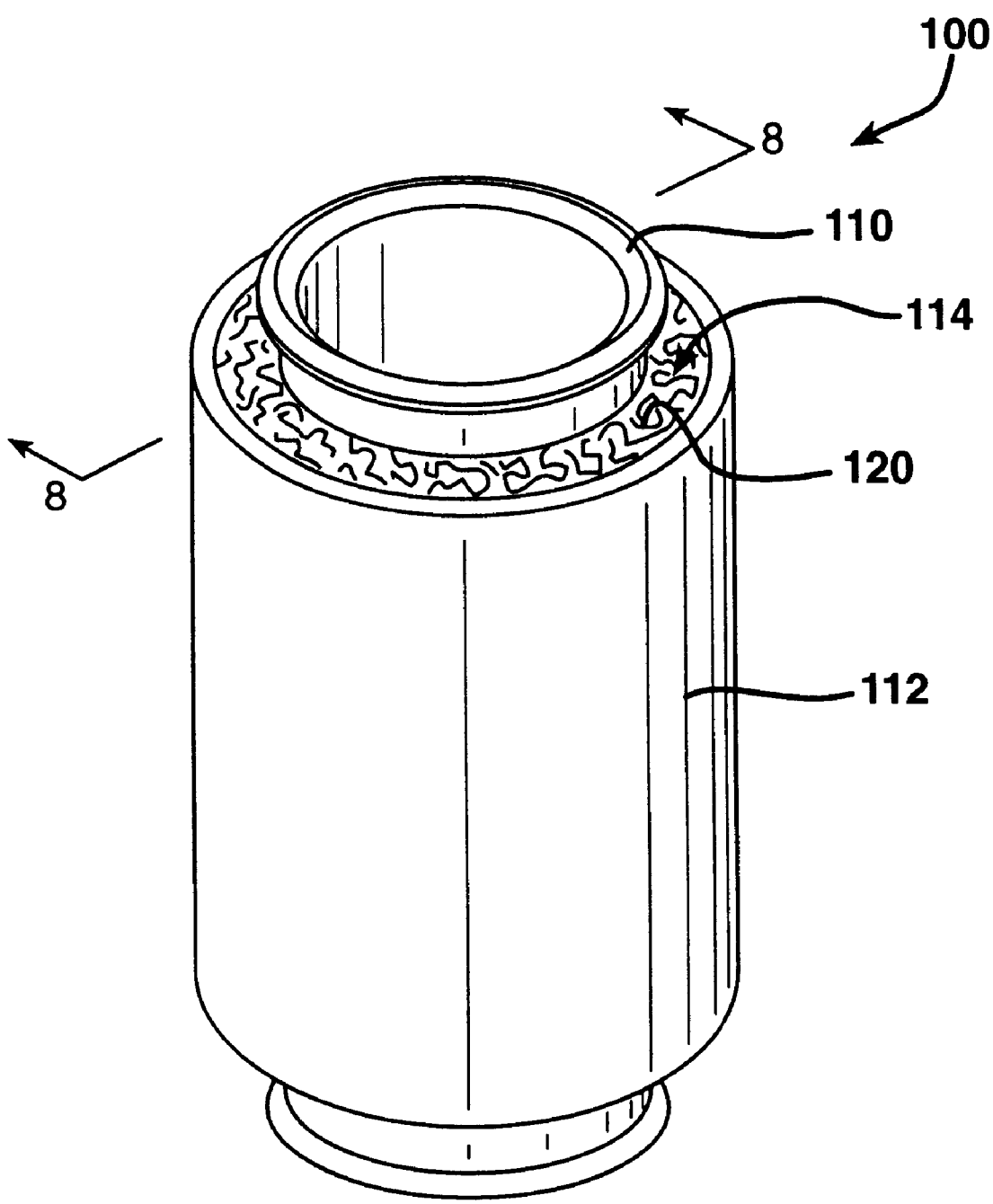
FIG. 1 is a perspective view of an insulated pipe assembly constructed in accordance with the present invention.
Figure 5:
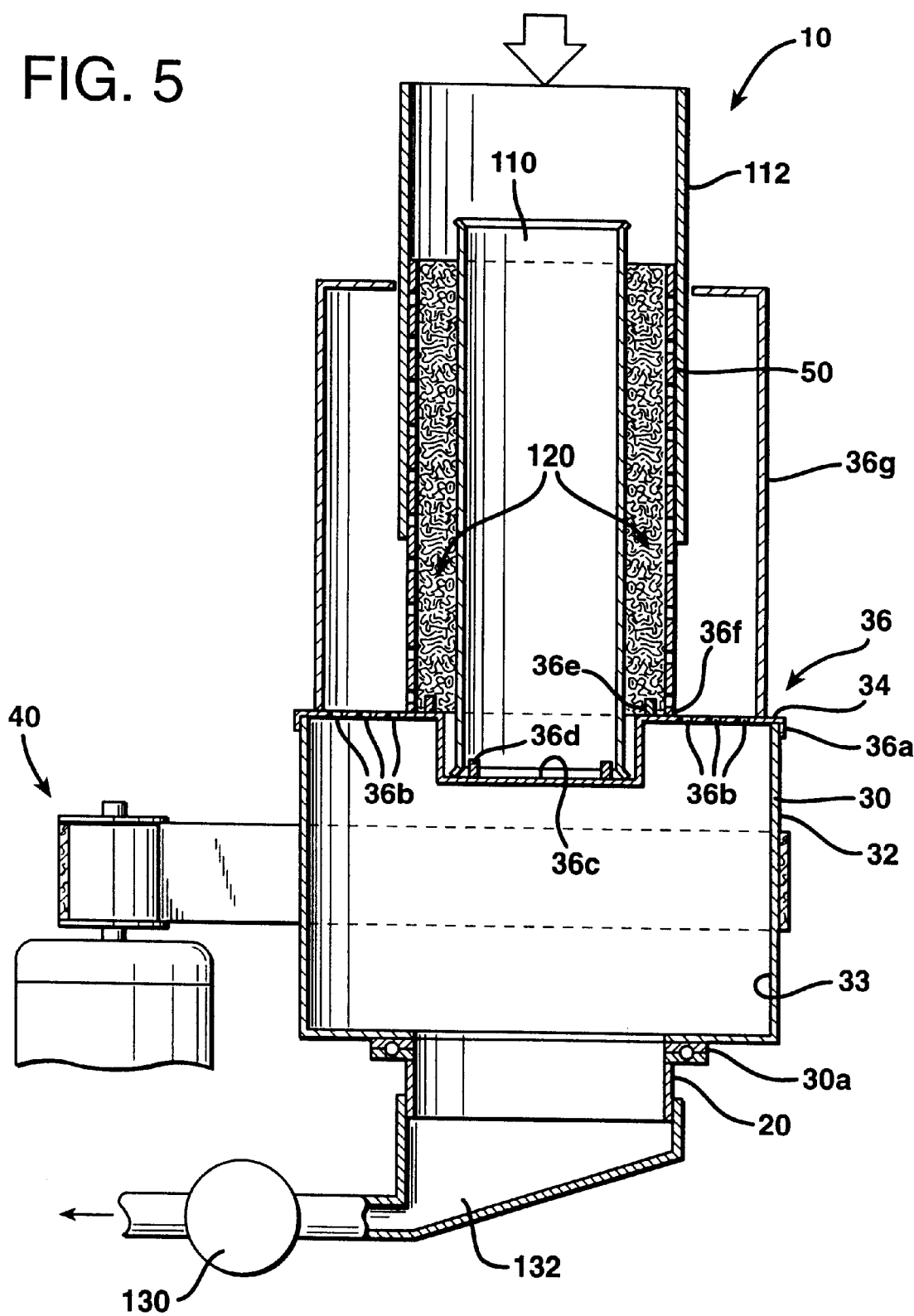
Figure 6:
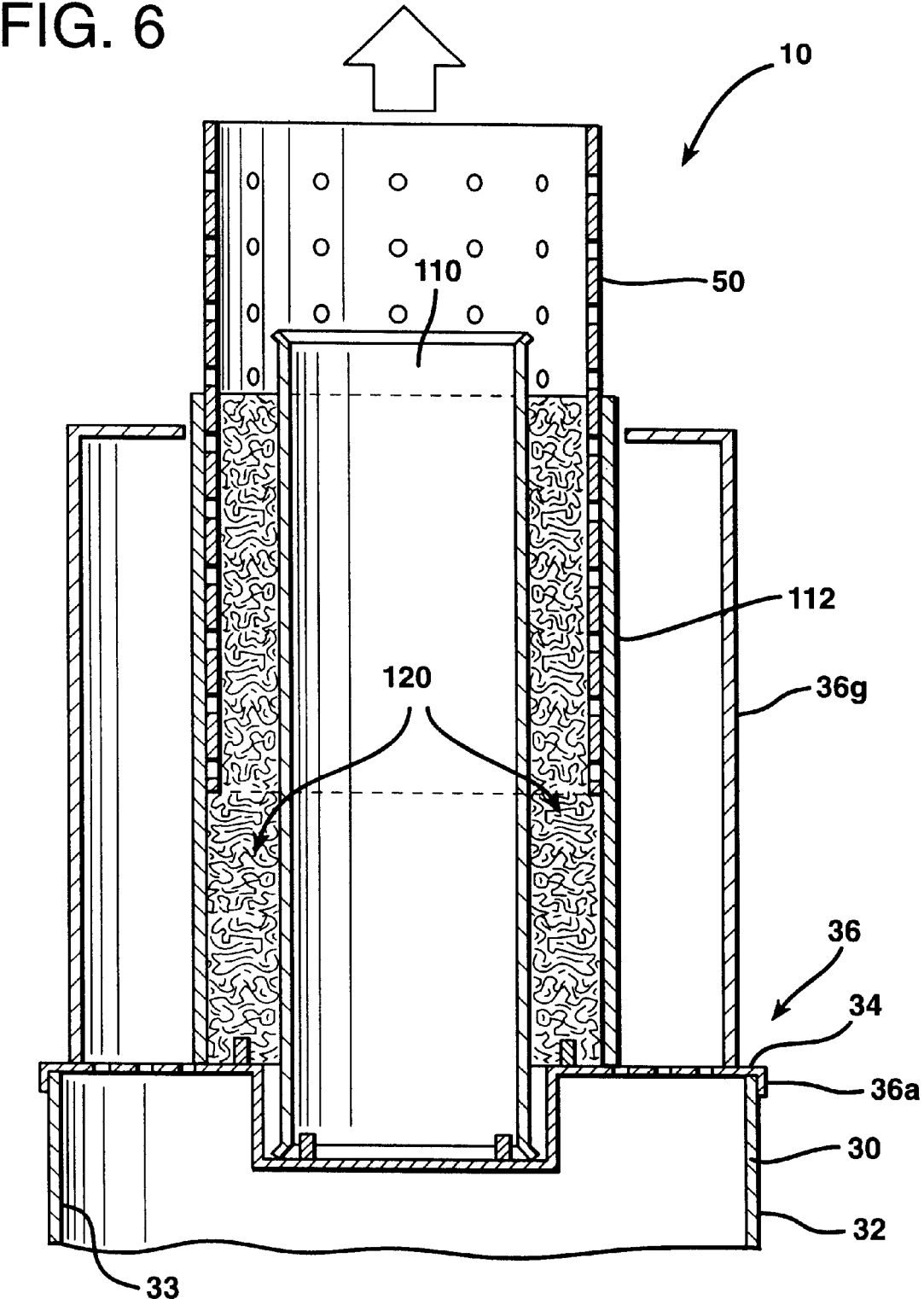
Figure 7:
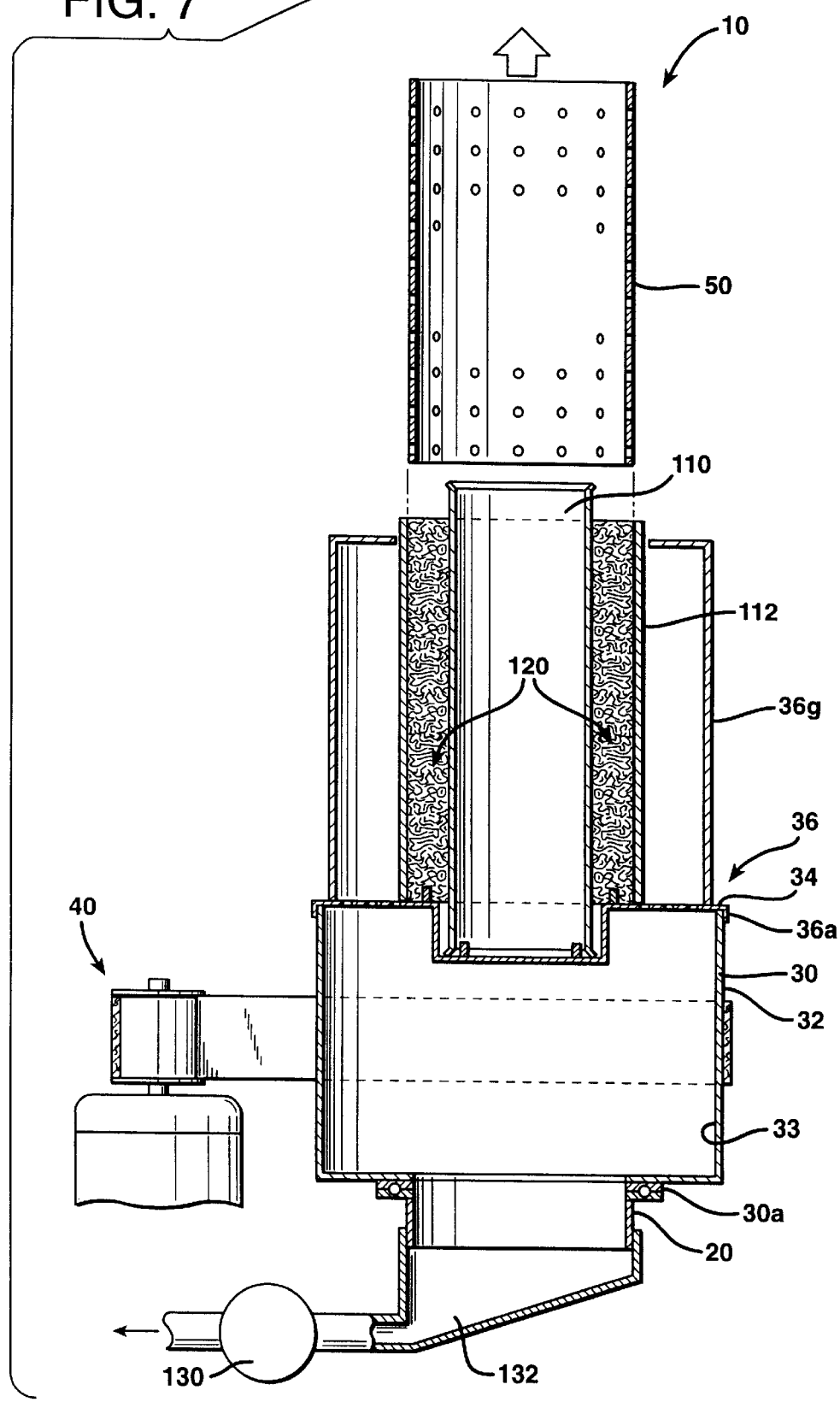
Figure 8:
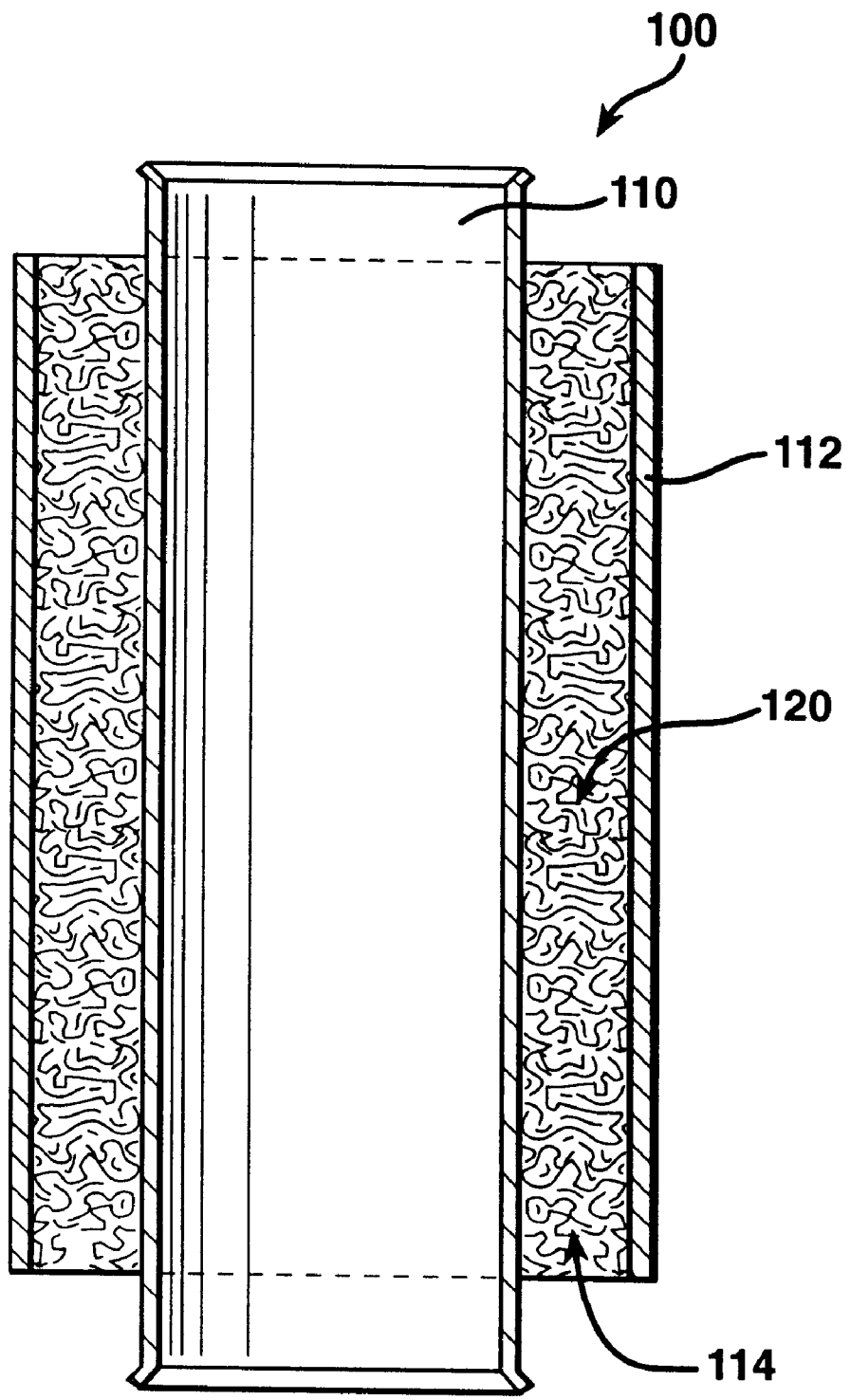
FIG. 8 is a view taken along section line 8—8 in FIG. 1.
Figure 9:
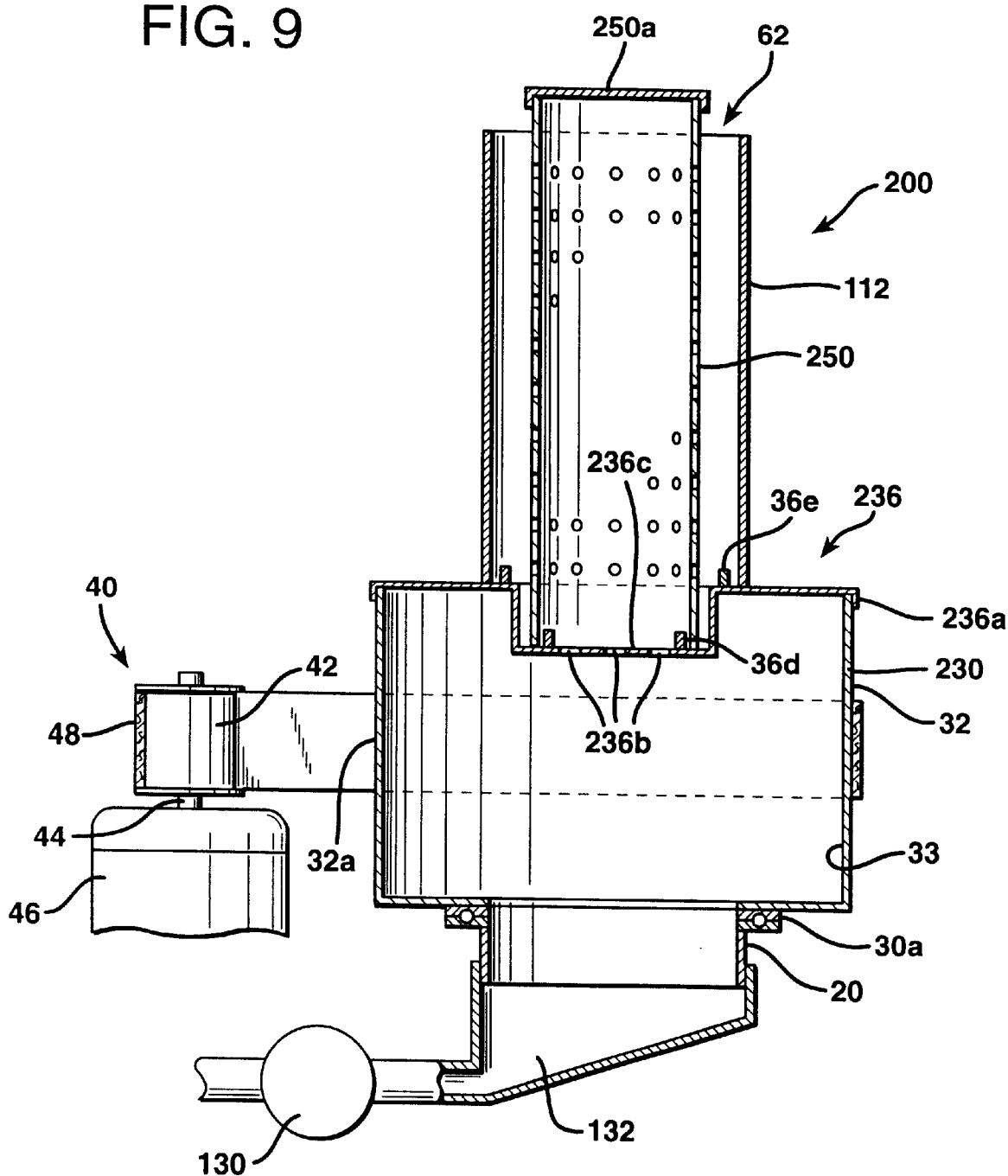
FIG. 9 is a side view, partially in cross section, of an apparatus constructed in accordance with a second embodiment of the present invention for forming the pipe assembly illustrated in FIG. 1.
Figure 10:
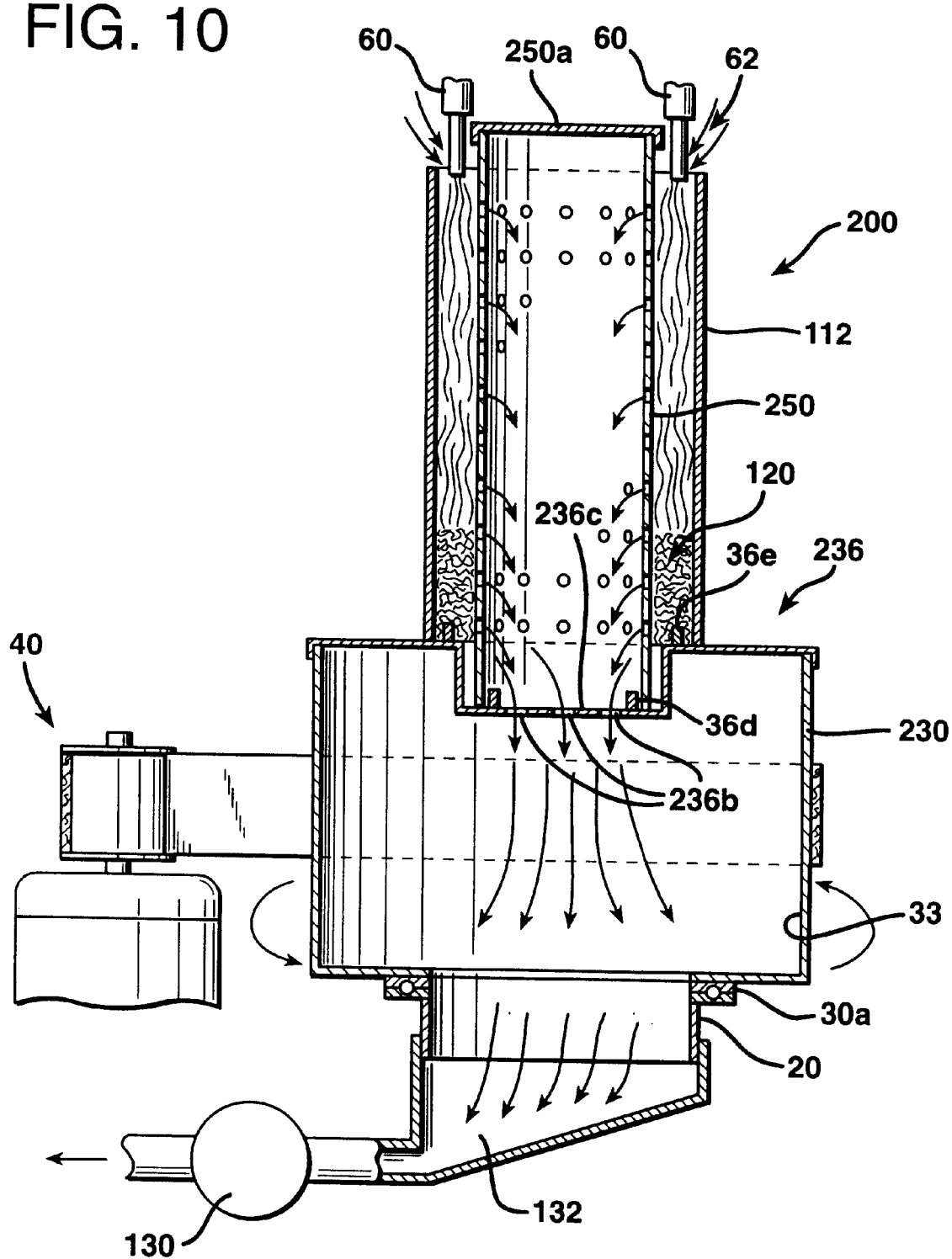
FIGS. 10–14 are sequential views of a process involving use of the apparatus illustrated in Fig. for forming the pipe assembly illustrated in FIG. 1.
Figure 11:
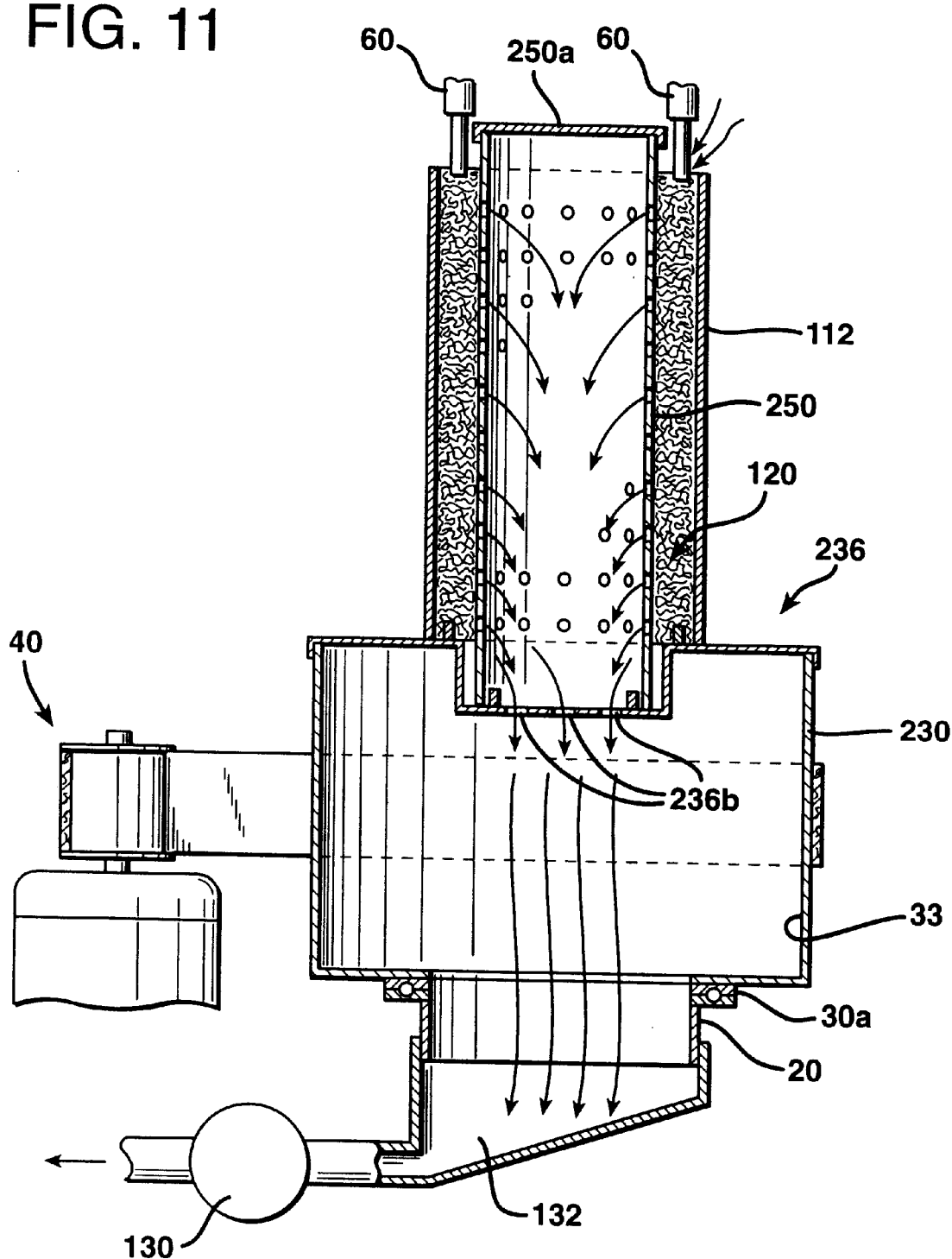

After the gap 62 has been substantially completely filled with material 120, the seal ring 36h is removed and an outer pipe 112 is fitted over the packing element 50, see FIG. 5. Thereafter, the packing element 50 is removed from between the packed insulation material 120 and the outer pipe 112, see FIGS. 6 and 7. The completed pipe assembly 100, which comprises solid-walled inner and outer pipes 110 and 112 and fiber insulation material 120 located in an annular passage or gap 114 between the pipes 110 and 112, is removed from the fixture 36. The finished assembly is illustrated in FIGS. 1 and 8.

In the illustrated embodiment, the inner and outer pipes are formed from a metal such as stainless steel or carbon steel and have a wall thickness of from about 0.5 mm to about 5 mm. The inner and outer pipes may also be formed from other metals and other materials such as polymeric materials. The outer pipe 112 has an inner diameter of from about 150 mm to about 800 mm, and the inner pipe 110 has an outer diameter between about 100 mm to about 750 mm. The length of the inner pipe 110 is from about 0.3 meters to about 2 meters. The length of the outer pipe 112 is from about 0.3 meters to about 2 meters. The passage 114 has a width of from about 20 mm to about 150 mm.

A packing apparatus 200, formed in accordance with a second embodiment of the present invention, is shown in FIGS. 9–14, wherein like reference numerals indicate like elements. In this embodiment, the fixed support 20 and the rotating device 40 are substantially identical to the fixed support and the rotating device 40 illustrated in the FIG. 2 embodiment. The exhaust box 230 is essentially the same as the exhaust box 30 illustrated in FIG. 2, except that the fixture 236 has been modified. The base plate 236a is provided with openings 236b only in the recess 236c. Further, a housing is not welded to the plate 236a and a seal ring is not provided. The apparatus 200 further includes an inner, perforated packing element 250. An outer perforated packing element as included in the FIG. 2 embodiment is not provided.

As illustrated in FIGS. 9–12, the inner element 250 is positioned within the recess 236c of the plate 236a. It fits about the first annular positioning element 36d located within the recess 236c. A generally solid cap 250a is fitted over the end of the inner element 250 opposite the end which contacts the recess 236c. The inner element 250 is removable from the plate 236a.

In forming an insulated pipe assembly 100 using the apparatus 200 illustrated in FIGS. 9–14, an outer pipe 112 is positioned about the inner packing element 250. It also fits around the annular positioning element 36e. Two filling nozzles 60 are located just above a gap 62 between the inner packing element 250 and the outer pipe 112. The nozzles 60 can be fixed in position by any conventional support structure (not shown) or held manually in position. The nozzles 60 are constructed in the manner described in the above-referenced application, U.S. Ser. No. 09/106,670.

The nozzles 60 supply fiber insulation material 120 to the gap 62. During the filling process, the exhaust box 230 and, hence, the inner element 250 and the outer pipe 112 are caused to rotate by the rotating device 40. Preferably, the inner element 250 and the outer pipe 112 rotate at a speed of from about 5 RPM to about 120 RPM and more preferably about 60 RPM. Also during the filling process, a vacuum source 130, which communicates with the inner cavity 33 via a conduit 132, is operated. The vacuum source 130 preferably creates a partial vacuum in the inner cavity 33 so that the pressure in the inner cavity 33 is from about 500 Pa to about 40,000 Pa below atmospheric pressure. The partial vacuum created within the inner cavity 33 results in air being pulled through the perforated packing element 250 and the openings 236b in the recess 236c, see FIGS. 10 and 11, thus causing the fiber insulation material 120 to be densely packed within the gap 62.

Figure 12:
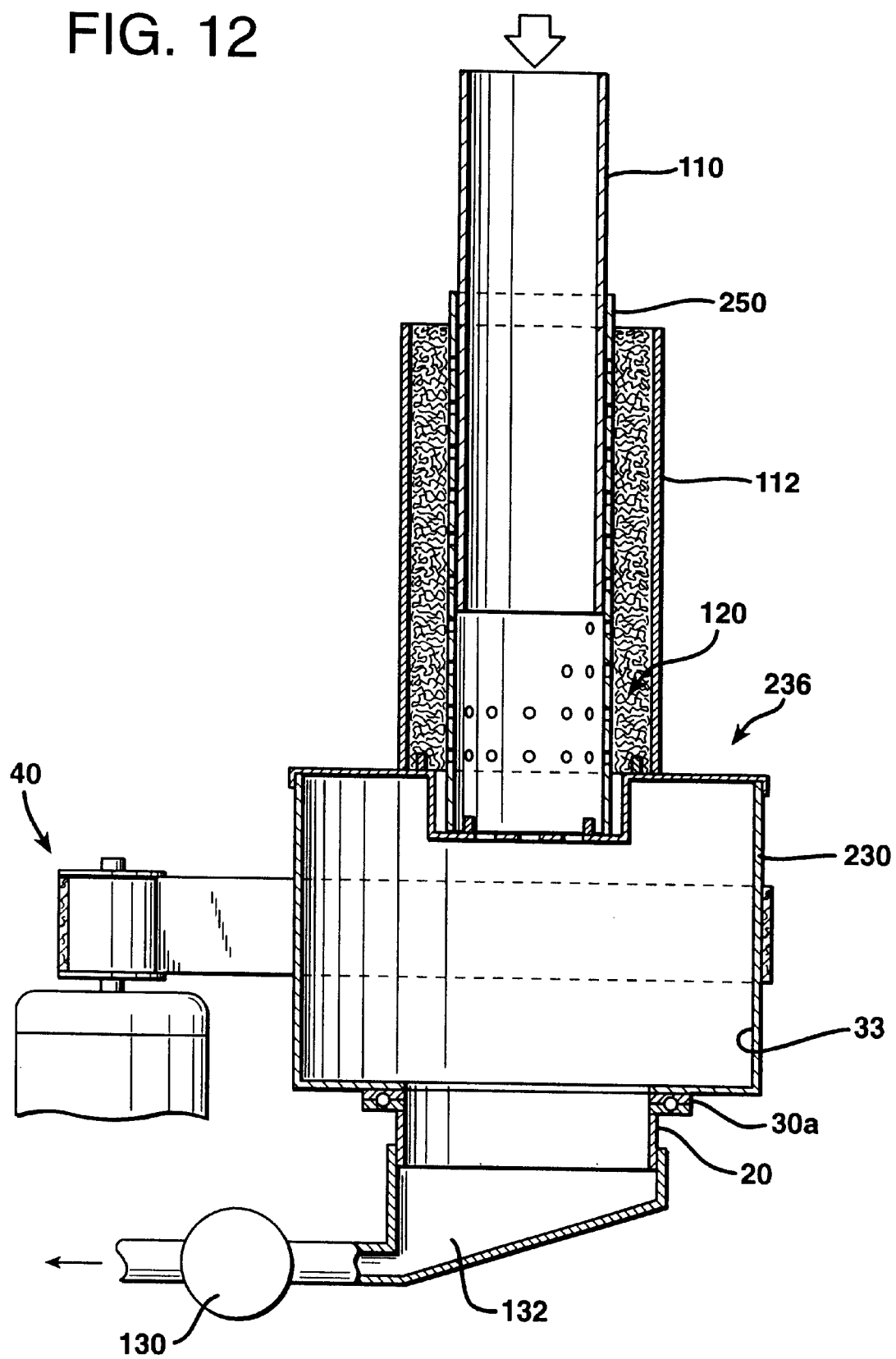
Figure 13:
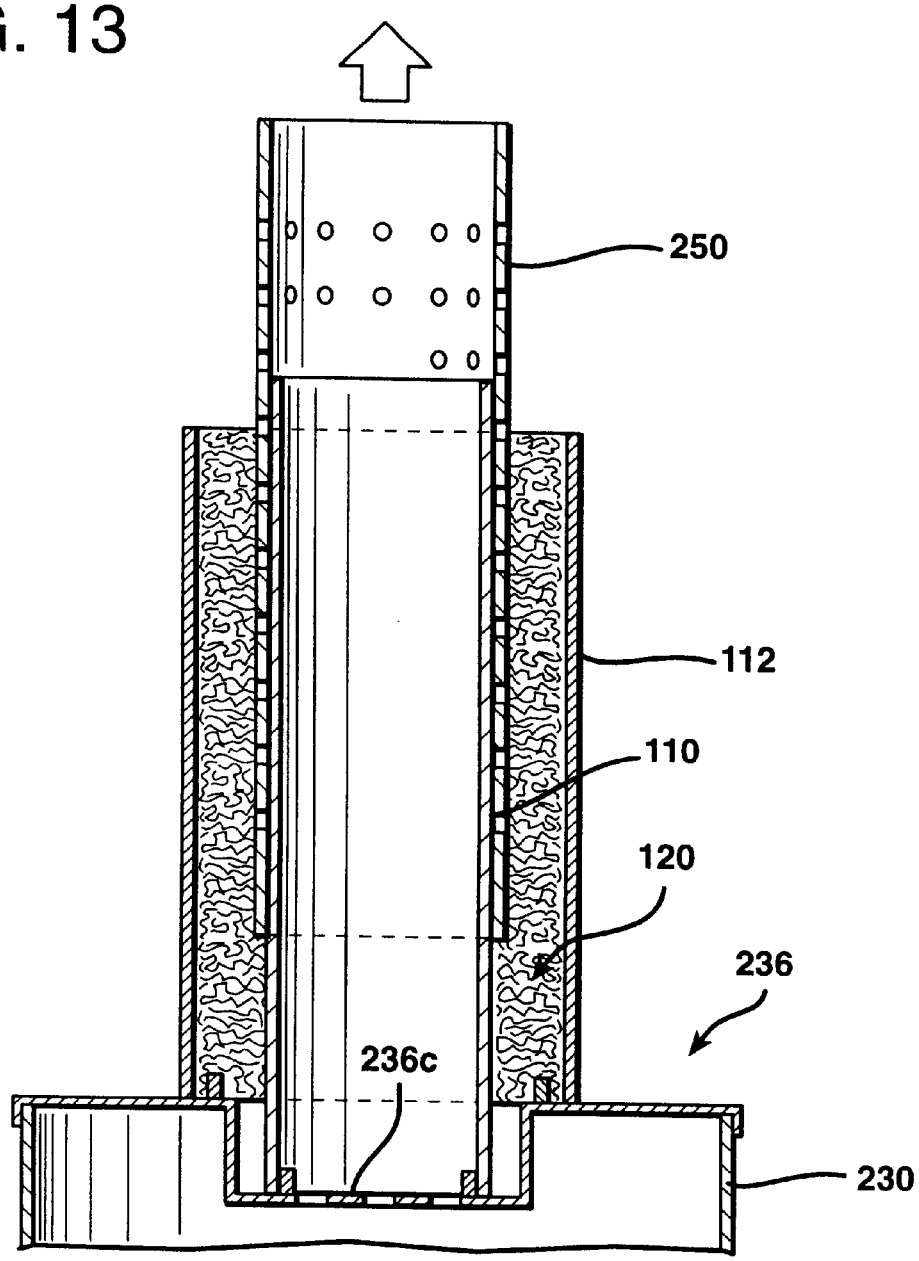
Figure 14:
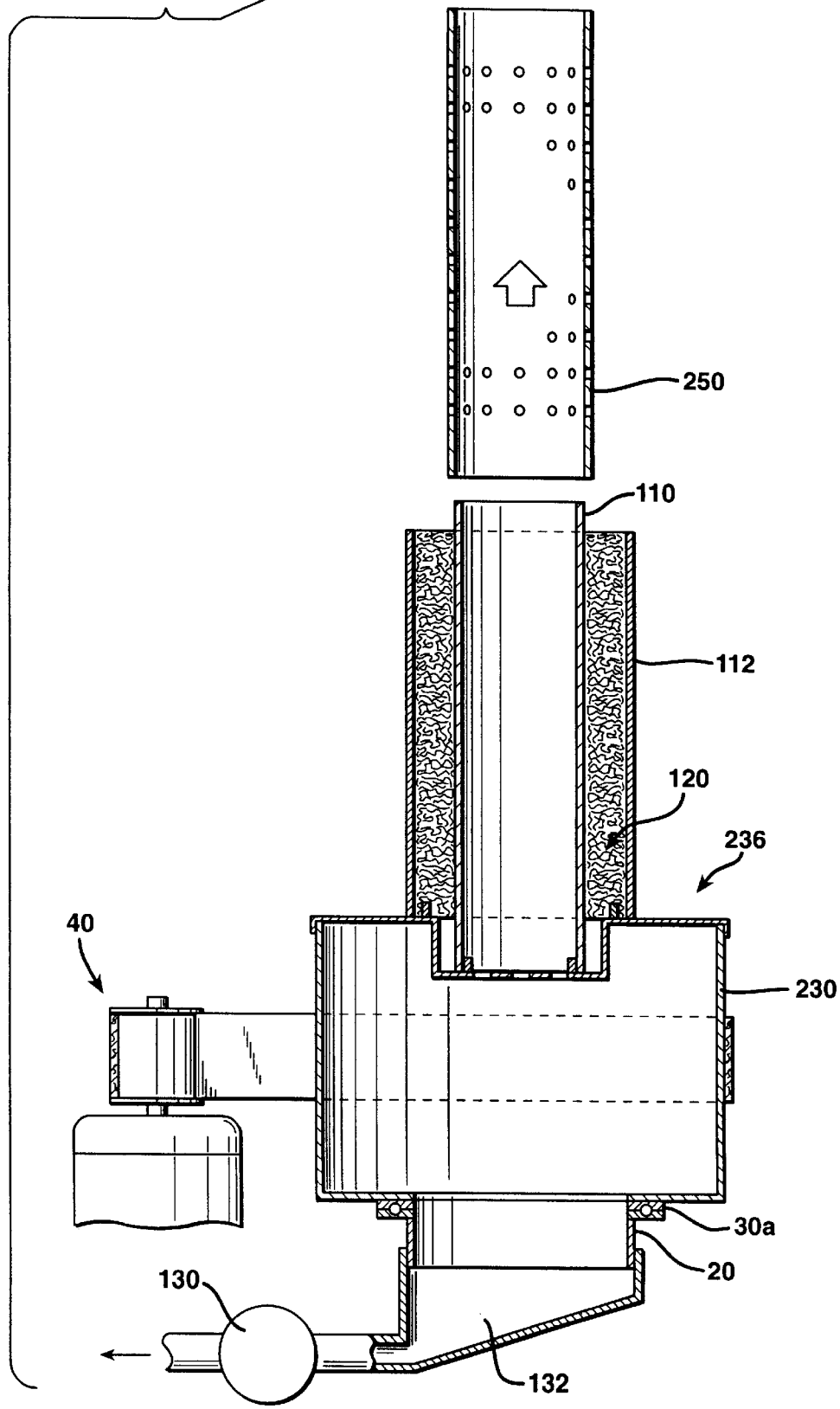

After the gap 62 has been substantially completely filled with material 120, the cap 250a is removed from the inner element 250 and an inner pipe 110 is inserted into the inner element 250, see FIG. 12. After the inner pipe 110 contacts the recess 236c, the packing element 250 is removed from between the packed insulation material 120 and the inner pipe 110, see FIGS. 13 and 14. The completed pipe assembly 100, which comprises solid-walled inner and outer pipes 110 and 112 and fiber insulation material 120 located in an annular passage or gap 114 between the pipes 110 and 112, is then removed from the fixture 236.

A packing apparatus 300, formed in accordance with a second embodiment of the present invention, is shown in FIGS. 15–23, wherein like reference numerals indicate like elements. In this embodiment, the fixed support 20 and the rotating device 40 are substantially identical to the fixed support and the rotating device 40 illustrated in the FIG. 2 embodiment. The exhaust box 330 is essentially the same as the exhaust box illustrated in FIG. 2, except that the fixture 336 has been modified. The base plate 336a is provided with openings 336b in the recess 336c as well as in the upper portion 336f. The apparatus 300 further includes an inner, perforated packing element 250 in addition to the outer packing element 50.

Figure 15:
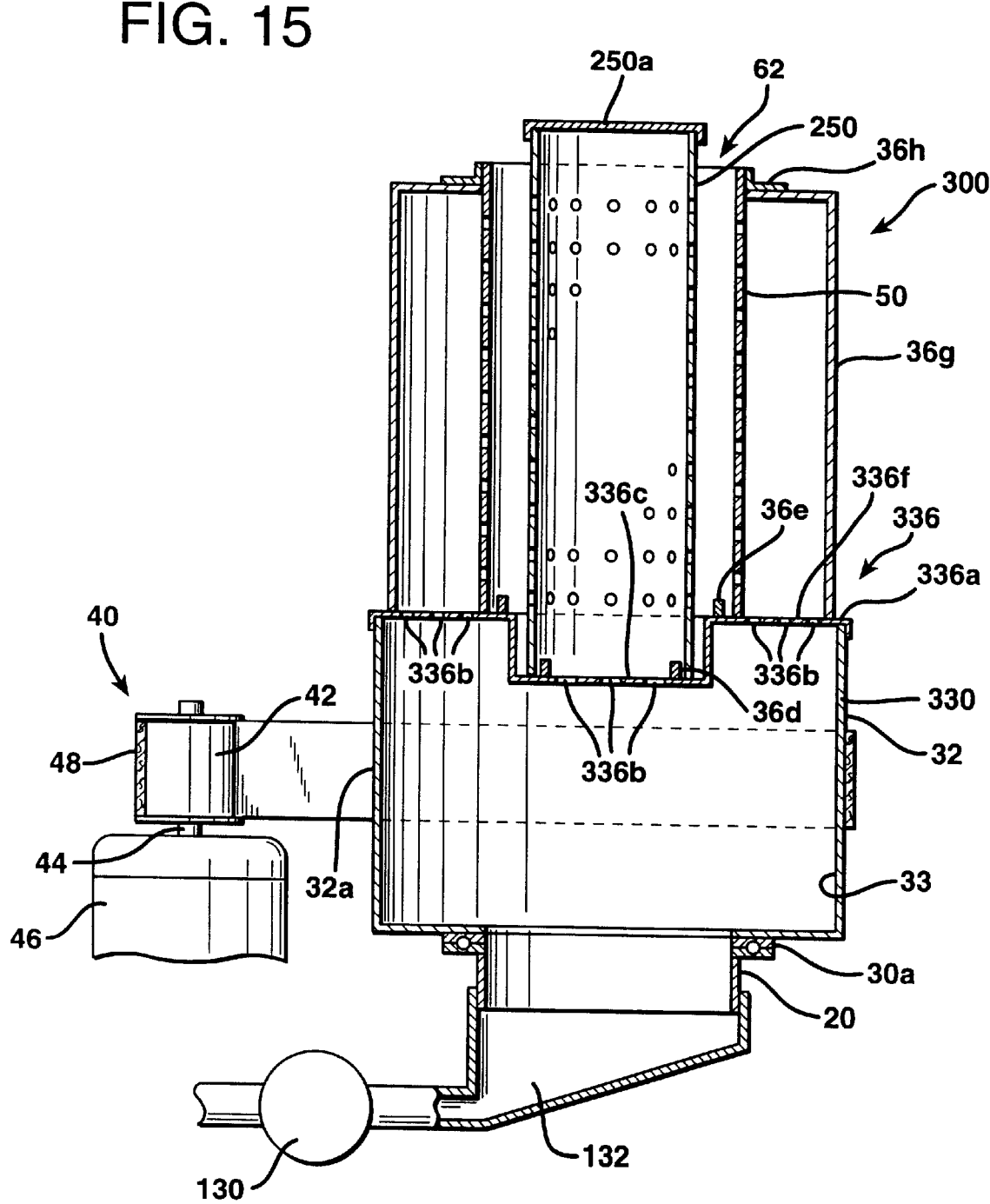
FIG. 15 is a side view, partially in cross section, of an apparatus constructed in accordance with a third embodiment of the present invention for forming the pipe assembly illustrated in FIG. 1.
Figure 16:
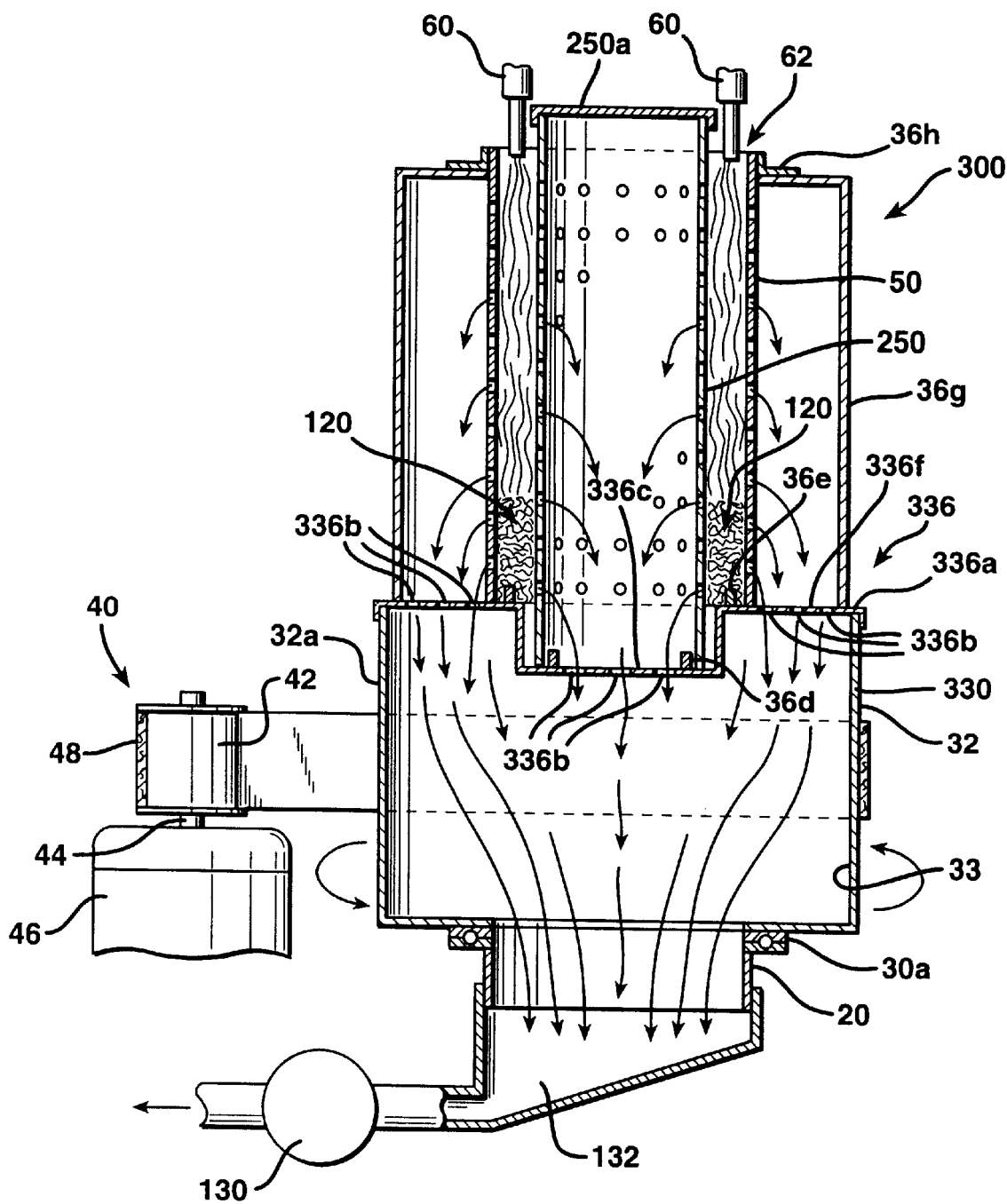
FIGS. 16–23 are sequential views of a process involving use of the apparatus illustrated in FIG. 15 for forming the pipe assembly illustrated in FIG. 1.
Figure 17:
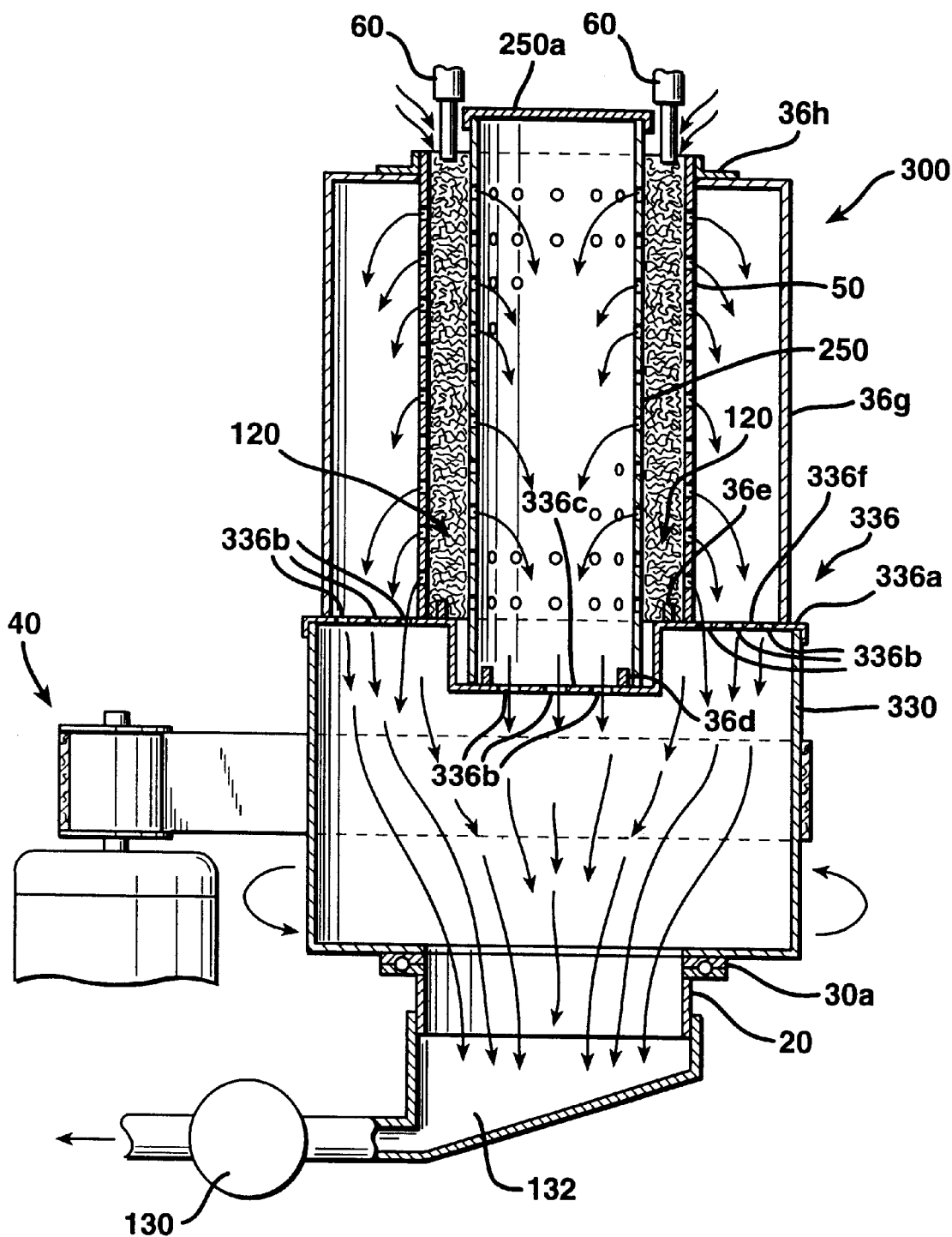
Figure 18:
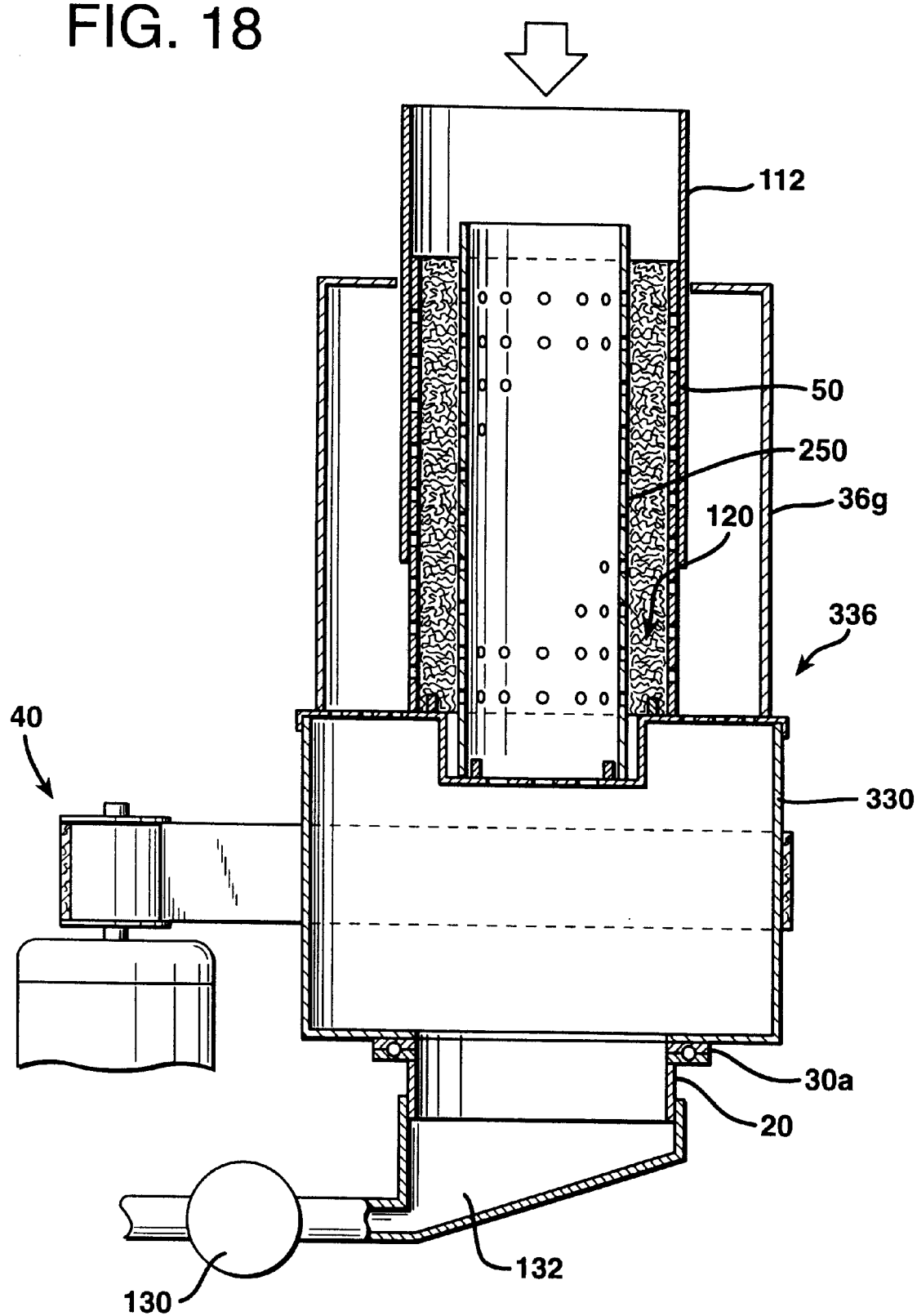
Figure 19:
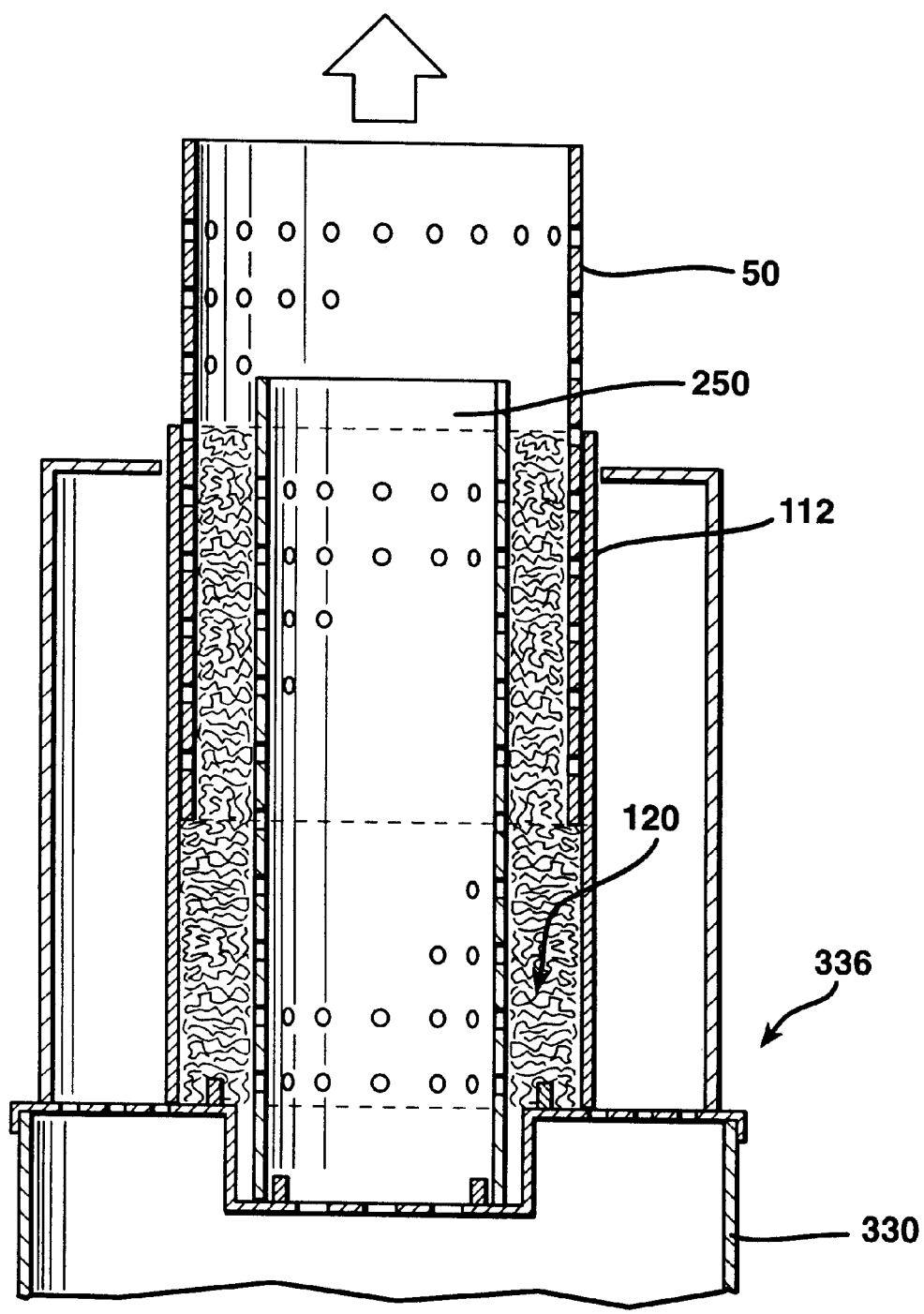
Figure 20:
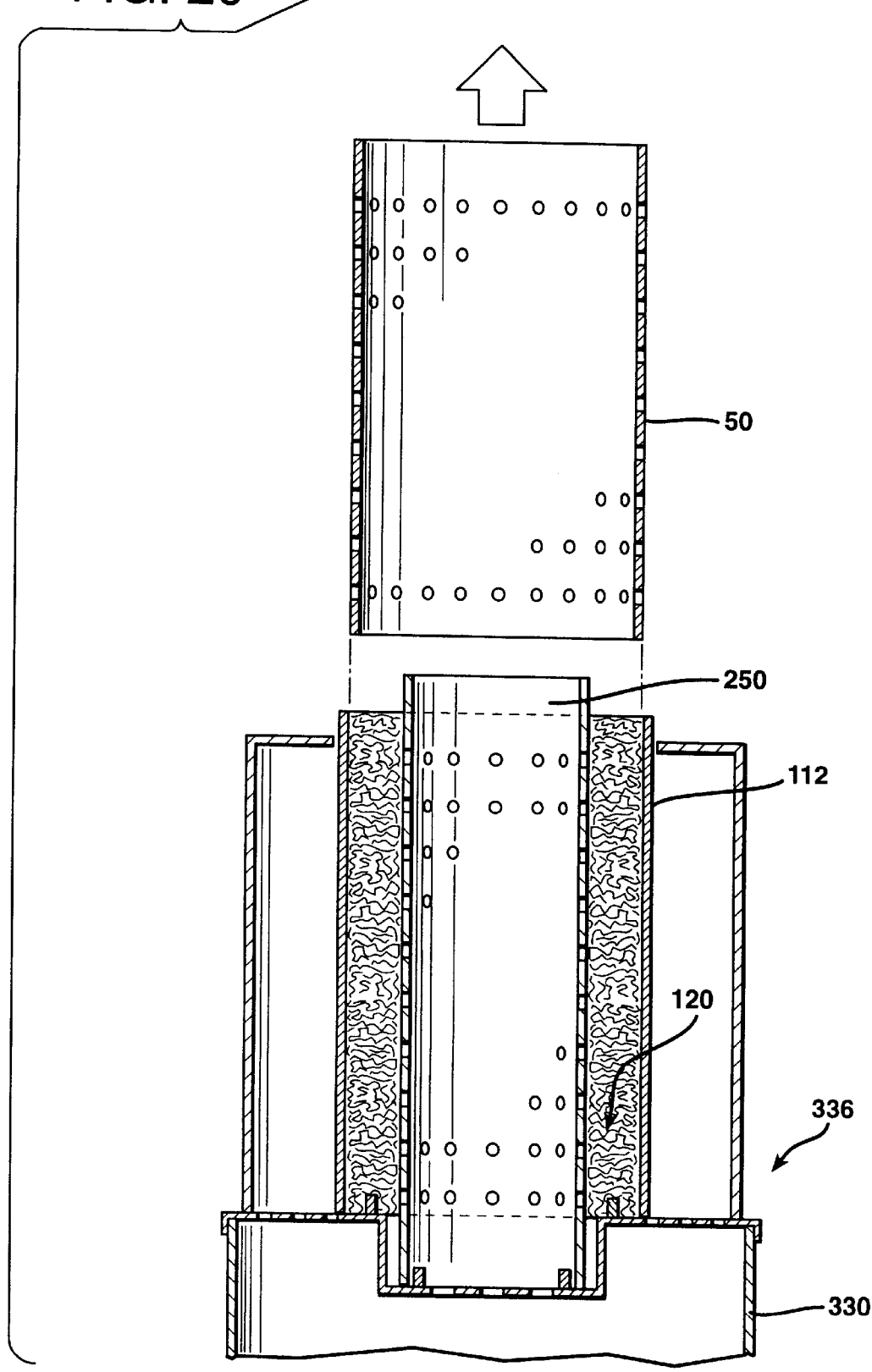
Figure 21:
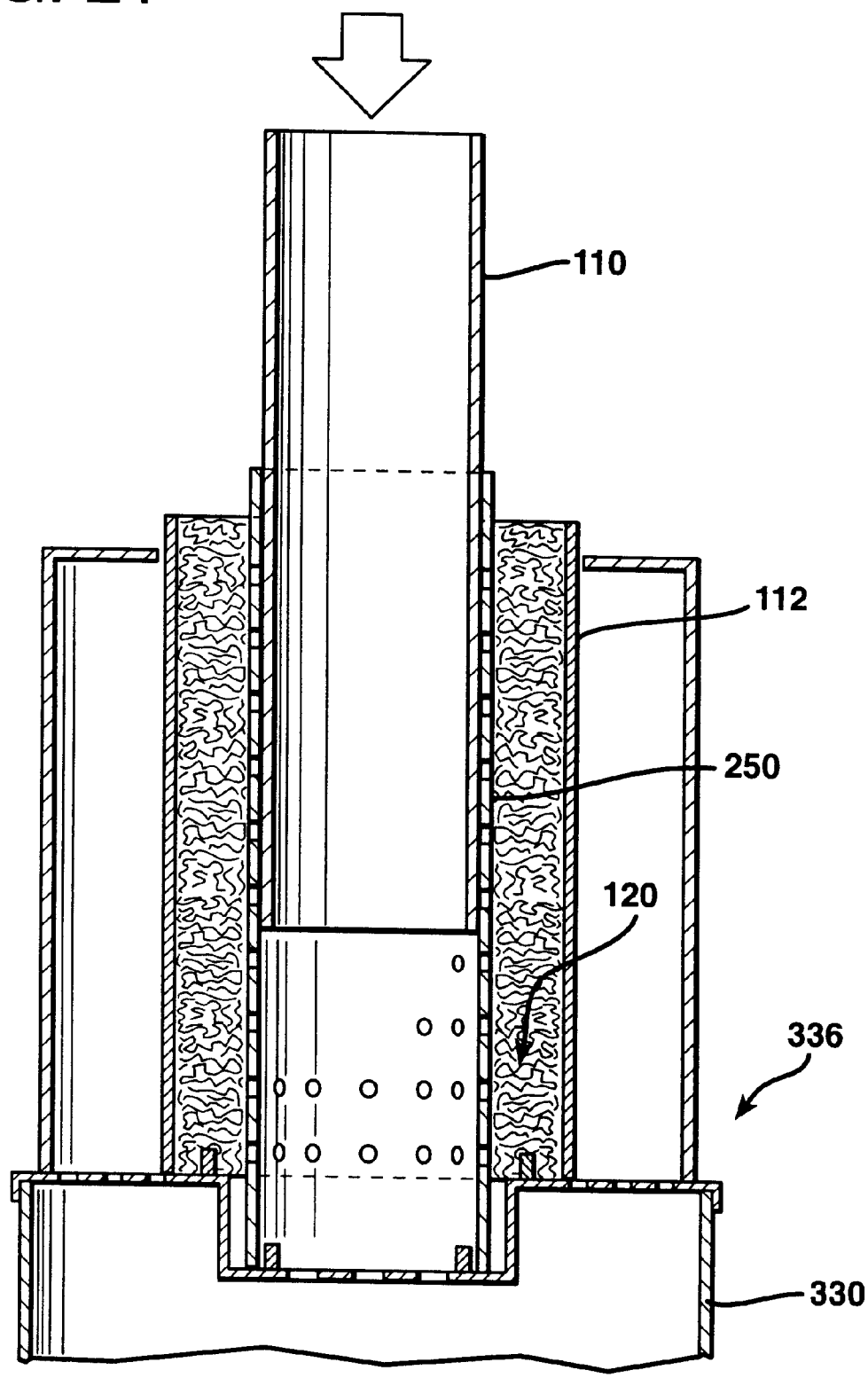
Figure 22:
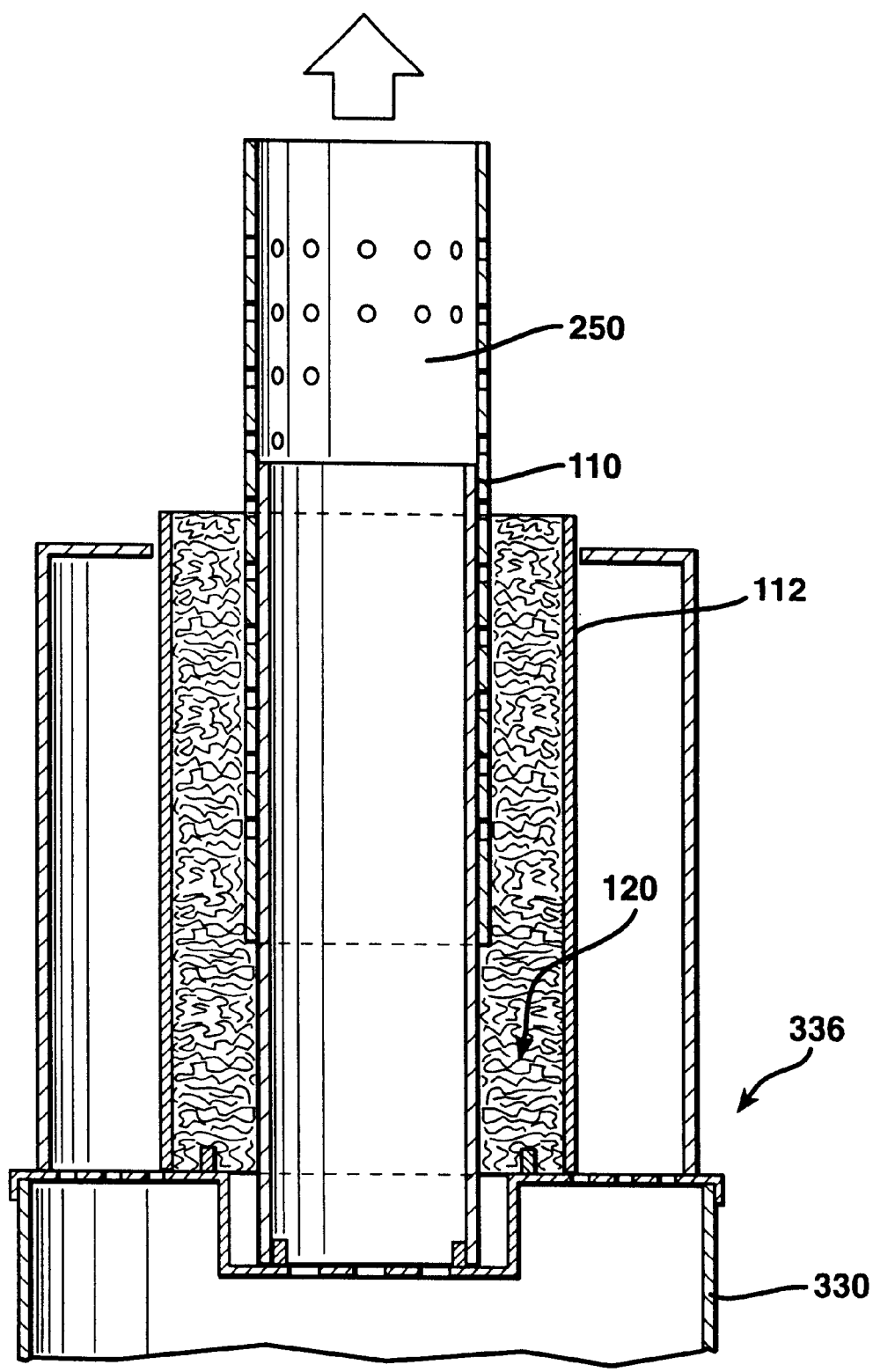
Figure 23:
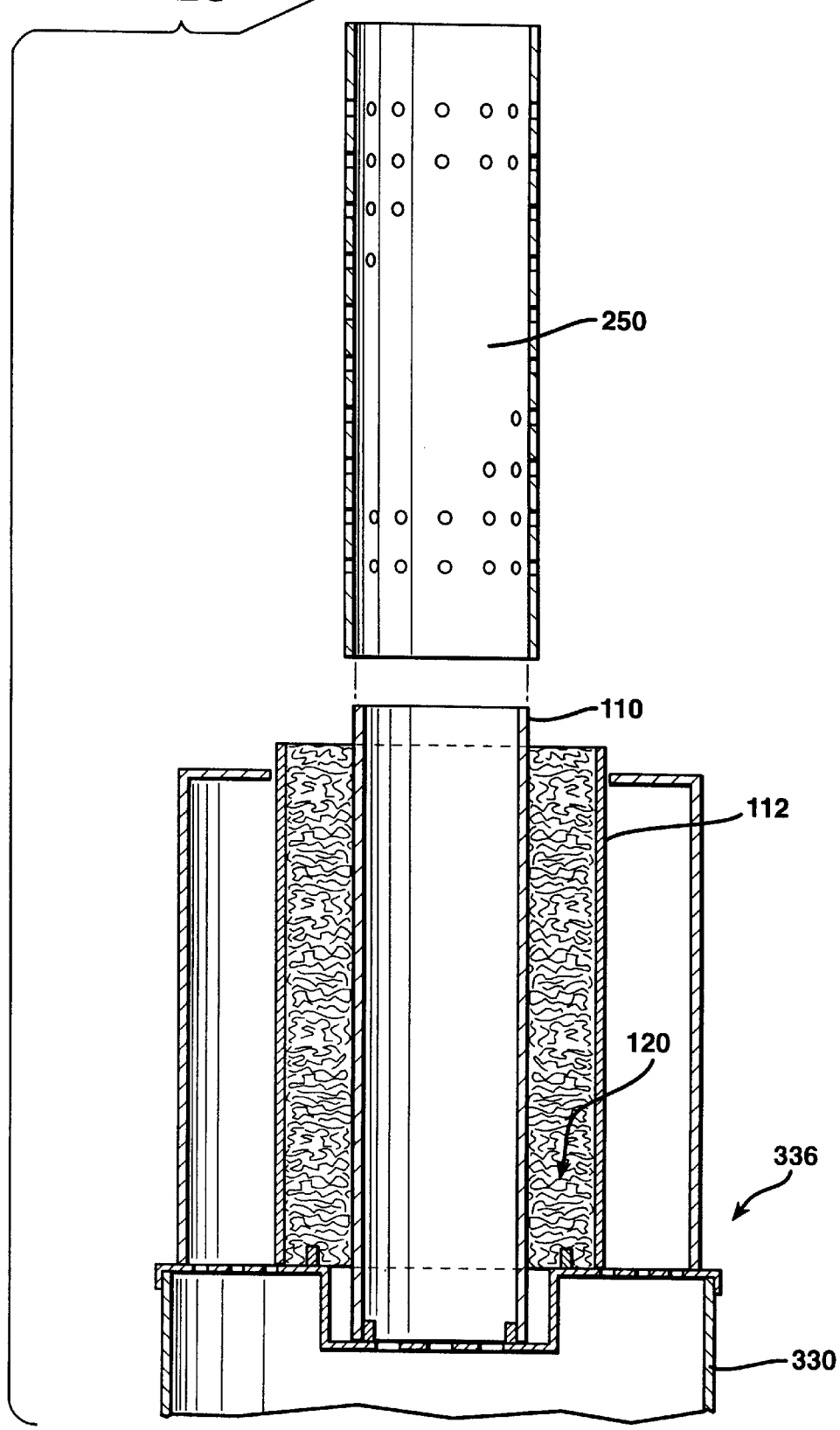

As illustrated in FIG. 15, the inner element 250 is positioned within the recess 336c of the plate 336a. It fits about the first annular positioning element 36d located within the recess 336c. A generally solid cap 250a is fitted over the end of the inner element 250 opposite the end which contacts the recess 336c. The inner element 250 is removable from the plate 336a. The outer element 50 is positioned within the housing 36g and sits on the upper portion 336f of the plate 336a. The outer element 50 fits about the annular positioning element 36e which properly locates the element 50 relative to the fixture 336. The outer element 50 is removable from the plate 336a. The seal ring 36h is positioned about the outer element 50, see FIG. 15, so as to effect a seal between the outer element 50 and the housing 36g.

In forming an insulated pipe assembly 100 using the apparatus 300 illustrated in FIG. 15, two filling nozzles 60 are located just above a gap 62 between the inner and outer packing elements 250 and 50. The nozzles 60 can be fixed in position by any conventional support structure (not shown) or held manually in position The nozzles 60 are constructed in the manner described in the above-referenced application, U.S. Ser. No. 09/106,670.

The nozzles 60 supply fiber insulation material 120 to the gap 62. During the filling process, the exhaust box 330 and, hence, the inner and outer elements 250 and 50 are caused to rotate by the rotating device 40. Preferably, the inner and outer elements 250 and 50 rotate at a speed of from about 5 RPM to about 120 RPM and more preferably about 60 RPM. Also during the filling process, a vacuum source 130, which communicates with the exhaust box inner cavity 33 via a conduit 132, is operated. The vacuum source 130 preferably creates a partial vacuum in the exhaust box inner cavity 33 so that the pressure in the inner cavity 33 is from about 500 Pa to about 40,000 Pa below atmospheric pressure. The partial vacuum created within the inner cavity 33 results in air being pulled through the perforated packing elements 250 and 50 and the openings 336b in the recess 336c and the upper portion 336f thus causing the fiber insulation material 120 to be densely packed within the gap 62, see FIGS. 16 and 17.

After the gap 62 has been substantially completely filled with material 120, the seal ring 36h and the cap 250a are removed. An outer pipe 112 is then fitted over the packing element 50, see FIG. 18. Thereafter, the packing element 50 is manually or otherwise removed from between the packed insulation material 120 and the outer pipe 112, see FIGS. 19 and 20. Next, an inner pipe 110 is inserted into the inner element 250, see FIG. 21. Thereafter, the packing element 250 is removed from between the packed insulation material 120 and the inner pipe 110, see FIGS. 22 and 23. The completed pipe assembly 100, which comprises solid-walled inner and outer pipes or elements 110 and 112 and fiber insulation material 120 located in an annular passage or gap 114 between the pipes 110 and 112, is then removed from the fixture 36.

The insulation material 120 is sufficiently packed in the annular gap 114 that it maintains the inner and outer pipes 110 and 112 properly positioned relative to one another. In other words, friction between the insulation material 120 and the pipes 110 and 112 maintains the assembly 100 as one unit. No additional means are required to maintain the assembly as a single unit.

While the form of apparatus herein described constitutes preferred embodiments of this invention, it is to be understood that the invention is not limited to this precise form of apparatus and that changes may be made therein without departing from the scope of the invention.

What is claimed is:

1. An insulation packing process comprising the steps of:
providing a first element having an outer surface and a second element having an inner surface, at least one of said first and second elements being perforated;
providing said first and second elements on a fixture, said second element being located so as to be positioned relative to said first element such that said first element outer surface and said second element inner surface define a passage between said first and said second elements for receiving fiber insulation material, said fixture forming part of an exhaust box and said exhaust box having an inner cavity which communicates with a vacuum source;
supplying fiber insulation material to said passage such that said material is packed into said passage;
rotating said fixture and said first and second elements during said supplying step; and
drawing a partial vacuum in said exhaust box via said vacuum source while the fiber insulation material is being supplied to said passage, said partial vacuum causing air to be pulled through said at least one perforated element so as to cause said fiber insulation material to be densely packed within said passage.

2. The insulation packing process as set forth in claim 1, wherein said step of providing fiber insulation material to said passage comprises the step of supplying expanded, continuous fiber strand material to said passage.

3. The insulation packing process as set forth in claim 2, wherein said expanded fiber strand material in said passage has a density of from about 50 grams/liter to about 200 grams/liter.

4. The insulation packing process as set forth in claim 1, wherein said first element comprises a substantially solid, cylindrical element and said second element comprises a substantially perforated, cylindrical element.

5. The insulation packing process as set forth in claim 1, wherein said first element comprises a substantially perforated, cylindrical element and said second element comprises a substantially solid, cylindrical element.

6. The insulation packing process as set forth in claim 1, wherein said first element comprises a substantially perforated, cylindrical element and said second element comprises a substantially perforated, cylindrical element.

7. The insulation packing process as set forth in claim 1, wherein said fixture and said first and second elements are rotated at a speed of from about 5 RPM to about 120 RPM.

8. The insulation packing process as set forth in claim 1, further comprising the step of adding an element having a generally solid wall after said passage has been filled with a desired amount of the fiber insulation material and removing said at least one perforated element.

9. An insulation packing process comprising the steps of:
providing a first element having an outer surface and a second element having an inner surface, at least one of said first and second elements being perforated;
locating said second element relative to said first element such that said first element outer surface and said second element inner surface define a passage between said first and said second elements for receiving fiber insulation material;
supplying fiber insulation material to said passage;
rotating said first and second elements during said supplying step; and
drawing air through said at least one perforated element while the fiber insulation material is being supplied to said passage so as to cause said fiber insulation material to be densely packed within said passage.

10. The insulation packing process as set forth in claim 9, wherein said step of providing fiber insulation material to said passage comprises the step of supplying expanded, continuous fiber strand material to said passage.

11. The insulation packing process as set forth in claim 10, wherein said expanded fiber strand material in said passage has a density of from about 50 grams/liter to about 200 grams/liter.

12. The insulation packing process as set forth in claim 9, wherein said first element comprises a substantially solid, cylindrical element and said second element comprises a substantially perforated, cylindrical element.

13. The insulation packing process as set forth in claim 9, wherein said first element comprises a substantially perforated, cylindrical element and said second element comprises a substantially solid, cylindrical element.

14. The insulation packing process as set forth in claim 9, wherein said first element comprises a substantially perforated, cylindrical element and said second element comprises a substantially perforated, cylindrical element.

15. The insulation packing process as set forth in claim 9, wherein said first and second elements are rotated at a speed of from about 5 RPM to about 120 RPM.

16. The insulation packing process as set forth in claim 9, further comprising the step of adding an element having a generally solid wall after said passage has been filled with a desired amount of the fiber insulation material and removing said at least one perforated element.

* * * * *